(12) United States Patent
Augustine

(10) Patent No.: US 7,725,456 B2
(45) Date of Patent: May 25, 2010

(54) ITEM MANAGEMENT WITH DATA SHARING AND SYNCHRONIZATION

(75) Inventor: Matthew S. Augustine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/741,091

(22) Filed: Apr. 27, 2007

(65) Prior Publication Data

US 2008/0270481 A1    Oct. 30, 2008

(51) Int. Cl.
 *G06F 17/30* (2006.01)
(52) U.S. Cl. .................. 707/713; 707/806
(58) Field of Classification Search .............. 707/3–5, 707/10, 100, 2, 200, 203; 709/203
See application file for complete search history.

(56) References Cited

U.S. PATENT DOCUMENTS

| | | | |
|---|---|---|---|
| 5,964,834 A | 10/1999 | Crutcher | |
| 6,295,541 B1 | 9/2001 | Bodnar et al. | |
| 6,553,037 B1 | 4/2003 | Pivowar et al. | |
| 6,760,728 B1 | 7/2004 | Osborn | |
| 7,003,546 B1 | 2/2006 | Cheah | |
| 2004/0172423 A1 | 9/2004 | Kaasten et al. | |
| 2004/0205470 A1 | 10/2004 | Jones et al. | |
| 2005/0172296 A1 | 8/2005 | Schleifer et al. | |
| 2005/0182792 A1 | 8/2005 | Israel et al. | |
| 2005/0198299 A1 | 9/2005 | Beck et al. | |
| 2006/0095507 A1 | 5/2006 | Watson | |
| 2006/0106879 A1 | 5/2006 | Zondervan et al. | |
| 2006/0173985 A1* | 8/2006 | Moore ..................... | 709/223 |
| 2006/0212792 A1 | 9/2006 | White et al. | |
| 2006/0218492 A1 | 9/2006 | Andrade | |
| 2006/0230021 A1 | 10/2006 | Diab et al. | |
| 2006/0247961 A1 | 11/2006 | Klemow | |
| 2006/0253489 A1 | 11/2006 | Kahn et al. | |
| 2006/0265396 A1 | 11/2006 | Raman et al. | |
| 2006/0265409 A1 | 11/2006 | Neumann et al. | |
| 2006/0265518 A1 | 11/2006 | Owens et al. | |
| 2006/0282822 A1 | 12/2006 | Weng | |
| 2006/0288329 A1 | 12/2006 | Gandhi et al. | |
| 2007/0022174 A1 | 1/2007 | Issa | |
| 2007/0078904 A1* | 4/2007 | Yoon et al. ................. | 707/200 |
| 2007/0100959 A1* | 5/2007 | Eichstaedt et al. ......... | 709/217 |
| 2007/0294366 A1 | 12/2007 | Ozzie et al. | |
| 2008/0126364 A1* | 5/2008 | Khosravy et al. ........... | 707/100 |
| 2008/0155112 A1* | 6/2008 | Ma et al. .................... | 709/231 |
| 2008/0195739 A1 | 8/2008 | Ozzie et al. | |
| 2008/0212616 A1 | 9/2008 | Augustine et al. | |
| 2008/0243874 A1 | 10/2008 | Suthar et al. | |

OTHER PUBLICATIONS

Ken Rimey, "Version Headers for Flexible Synchronization and Conflict Resolution", Retrieved at <<http://www.hiit.fi/publications/pub_files/hiit-2004-3.pdf>>, Nov. 22, 2004.

(Continued)

*Primary Examiner*—Cheryl Lewis

(57) ABSTRACT

Systems and method for accessing and providing item management functionality with synchronization relationships that share data using a feed that may itself contain synchronization and item information are disclosed. Such systems and methods may enable an endpoint to use item management functionality provided by an item management module to generate or update a feed.

18 Claims, 9 Drawing Sheets

OTHER PUBLICATIONS

Leonard Kawell Jr., et al, "Replicated Document Management in a Group Communication System", Retrieved at <<http://delivery.acm.org/10.1145/1030000/1024798/p395-kawell.pdf?key1=1024798&key2=1402853611&coll=GUIDE&dl=GUIDE&CFID=6163663&CFTOKEN=68289132>>, Portland, Or., Sep. 26-28, 1998.

"Microsoft Team RSS Blog; Simple Sharing Extensions for RSS and OPML", Retrieved at <<http://blogs.msdn.com/rssteam/archive/2005/12/01/498704.aspx>>, Dec. 1, 2005.

Benoit Marchal, "Working XML: Expand RSS capabilities with RSS extensions", Retrieved at <<http://www-128.ibm.com/developerworks/xml/library/x-wxxm36.html>>, Aug. 15, 2006.

Vadim Zaliva, et al., "Enhanced "enclosures" support in RSS and ATOM Syndication", Retrieved at <<http://www.crocodile.org/lord/RSSenclosures/RSSenclosures.pdf>>, Dec. 15, 2004.

Atom Enabled, "What is Atom?", Retrieved at <<http://atomenabled.org>>, Apr. 5, 2007.

J. Gregorio, et al., "The Atom Publishing Protocol", Retrieved at <<http://www.ietf.org/internet-drafts/draft-ietf-atompub-protocol-14.txt>>, Copyright The IETF Trust 2007, Mar. 4, 2007.

"Front Page Atom Wiki; The Atom Project", Retrieved at <<http://intertwingly.net/wiki/pie/FrontPage>>, Apr. 5, 2007.

Dave Winer, "RFC: MetaWeblog API", Retrieved at <<http://www.xmlrpc.com/metaWeblogApi>>, Mar. 14, 2002.

"Google Data API's (Beta) Developers Guide; Google Data API's Overview", Retrieved at <<http://code.google.com/apis/gdata/overview.html>>, , Apr. 5, 2007.

Ray Ozzie, "Really Simple Sharing", Retrieved at <<http://rayozzie.spaces.live.com/blog/cns!FB3017FBB9B2E142!175.entry>>.

Zimbra, "A Pint of Ale—Ajax Linking and Embedding", Retrieved at <<http://www.zimbra.com/blog/archives/2006/04/zimbra_ale-ajax_linking_and_embedding.html>>, Apr. 3, 2006.

Dion Hinchcliffe, "How Simple Sharing Extensions Will Change the Web", Retrieved at <<http://web2.wsj2.com/how_simple_sharing_extensions_will_change_the_web.htm>>.

MSDN, "Frequently Asked Questions For Simple Sharing Extensions (SSE)", Retrieved at <<http://msdn.microsoft.com/xml/rss/ssefaq/>>, Copyright 2006 Microsoft Corporation.

"Microsoft Team RSS Blog, SSE Update and Tutorial", Retrieved at <<http://blogs.msdn.com/rssteam/archive/2006/01/25/517473.aspx>>, Jan. 25, 2006.

"Microsoft Team RSS Blog; More on SSE", Retrieved at <<http://blogs.msdn.com/rssteam/archive/2005/12/07/501326.aspx>>, Dec. 7, 2005.

Cori Shlegel, "Simple Sharing Extensions Up Close", Retrieved at <<http://kinrowan.net/blog/wp/archives/2005/11/23/sse-up-close>>.

Jon Udell, "Dueling Simplicities", Retrieved at <<http://weblog.infoworld.com/udell/2005/11/22.html>>, Nov. 22, 2005.

Ozzie, et al., "Simple Sharing Extensions For Atom And Rss", Retrieved at <<http://msdn.microsoft.com/en-us/xml/bb510102.aspx>>, May 7, 2007.

Ektron Inc, "Ektron CMS200", pp. 1-3.

"RSSOwl | RSS / RDF / Atom Newsreader", http://www.dirfile.com/rssowl_rss_rdf_atom_newsreader.htm.

Attensa Inc., "Enterprise RSS the Center of Attention", 111 SW 5th Ave. Suite 2260 Portland, OR 97204, Dated May 2006, pp. 1-11.

Heinz Wittenbrink, "RSS and Atom Understanding and Implementing Content Feeds and Syndication", Dated Nov. 2005, pp. 1-37.

* cited by examiner

US 7,725,456 B2

ITEM MANAGEMENT WITH DATA SHARING AND SYNCHRONIZATION

BACKGROUND

Synchronizing and sharing data between multiple endpoints may be accomplished in a variety of ways. In some implementations, synchronization of data may be implemented, at least in part, by the addition of data, such as synchronization data, to a feed that contains data items. For example, one endpoint might publish a feed that contains data items. Another endpoint, or more than one other endpoint, might subscribe to the feed and be notified when, for example, new items are added or existing items are changed. In addition, a subscribing endpoint might publish its own feed, with the same data as is provided in the original publisher's feed and also with changes or additions made by the subscriber. The original publisher might then subscribe to this second feed. Through these mutual subscriptions, and using synchronization data or information in the shared feeds, changes made by either endpoint may be reflected in the data maintained by both endpoints. Other techniques may also be used, including, for example, procedures for operating with conflicts that might occur, for example, when multiple endpoints change the same item independently.

When data sharing and synchronization is implemented as previously introduced, or when it is implemented in at least some other manners, each endpoint that shares data in a synchronization relationship may want to ensure that a feed that the endpoint publishes conforms to an organization or layout required by the synchronization procedures or techniques. For example, to add a new item to a feed, an endpoint may want to add both information about the item and also add synchronization data associated with the item. If the resulting feed does not conform to one or more particular standards or requirements—perhaps if the correct synchronization data is not added, or if the synchronization data is not formatted or provided in the feed in the correct way, and so on—a variety of problems may occur, including in some cases an inability to share or synchronize the new item. A desire to produce a feed that conforms to a required organization or layout may also be applicable for other types of operations, including modifying existing items, deleting existing items, and so on.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward the implementation of item management functionality with synchronization relationships that share data using a feed that itself may contain synchronization and item information or data. In at least some cases, rather than generating or updating a feed itself, an endpoint might use item management functionality provided by an item management module to generate or update a feed. In so doing, the endpoint may at least in some cases not need to implement or provide at least some of the item management functionality itself—instead, at least some of the item management functionality may be provided by the item management module.

DETAILED DESCRIPTION

Figure 1:
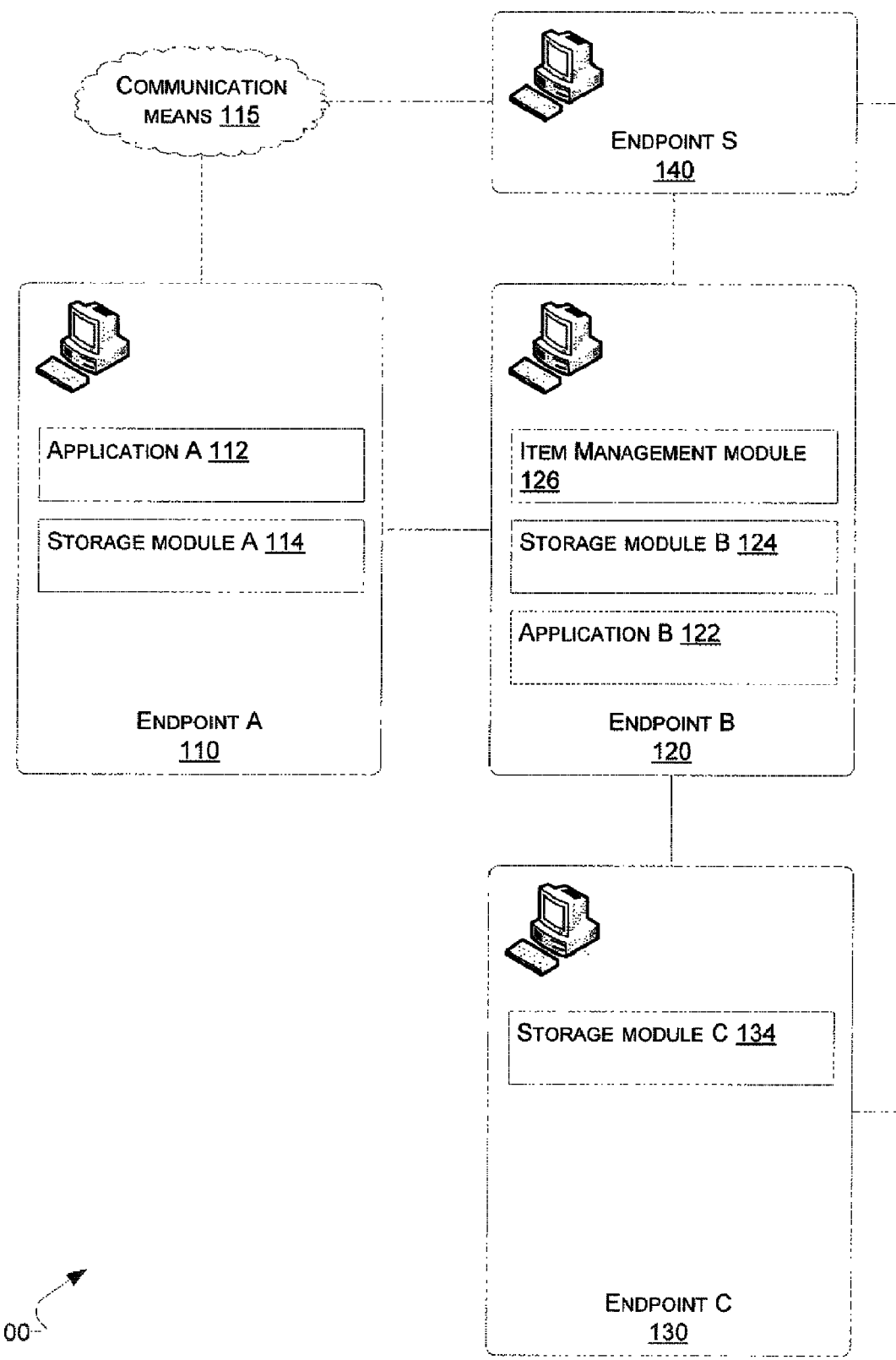
FIG. 1 illustrates an exemplary system in which item management functionality may be used or implemented.

Described herein are various techniques and technologies directed toward the implementation of item management functionality with synchronization relationships that share data using a feed that itself may contain synchronization and item information or data. More particularly, in at least some cases, rather than generating or updating a feed itself, an endpoint might use item management functionality provided by an item management module to generate or update a feed. In so doing, the endpoint may at least in some cases not need to implement or provide at least some of the item management functionality itself—instead, at least some of the item management functionality may be provided by the item management module.

In general, in some implementations, synchronization of data may be implemented, at least in part, by the addition of particular data to a feed of data provided using a possibly widely accepted protocol like RSS ("Really Simple Syndication" or "Rich Site Summary"). For example, in an exemplary implementation with a topology that consists of only two endpoints that communicate with each other, one endpoint might publish an RSS feed that contains some type or types of information. In perhaps one example, the feed might include calendar item information represented using a format like iCalendar or hCalendar, or some other format (but could of course contain any data). The other endpoint might subscribe to the feed provided by the first endpoint and be notified when, for example, the first endpoint adds a new calendar item or changes an existing calendar item. In addition, a subscribing endpoint might publish its own feed, with the same data as is provided in the original publisher's feed and also with changes or additions made by the subscriber. The original publisher might then subscribe to this second feed. Through these mutual subscriptions, changes made by either endpoint may be reflected in the data maintained by both endpoints, enabling bi-directional synchronization. Multiple endpoints may participate and share the data by subscribing to at least one of the feeds provided by another endpoint and similarly publishing their own feed.

In at least some implementations, the synchronization data in a feed, and the processes to be followed by at least particular endpoints when exchanging data may be the same as or similar to those associated with a protocol such as "Simple Sharing Extensions" (SSE). While explained in more detail below, SSE may be understood as defining extensions to—or additional data to be used with—feed protocols like RSS and Atom, or other feed protocols or documents, where the extensions relate to information that may be used when transferring or synchronizing data using, for example, an RSS feed. In some cases, an RSS, Atom, or other type of feed that includes SSE information may be referred to as an "SSE feed."

SSE also defines procedures to be followed by endpoints so that the synchronization information in the feed conforms to a particular organization and, as a result, may be read and used by other endpoints in synchronization relationships. As just one example, SSE specifies particular synchronization information that may exist for an item in an SSE feed. When a new item is created, an endpoint may be responsible for ensuring that the appropriate SSE information is associated with the new item, and that the SSE information is provided in the feed in the correct location, using the correct names, and so on. SSE defines other procedures that also require particular data to be included when, for example, an endpoint modifies an existing item, deletes an existing item, incorporates changes from other endpoints, and so on.

While the synchronization information and organization used in a feed may be specified by something like SSE, the application of such standards may in some cases be non-trivial. For example, to create or modify documents that use SSE, an endpoint may need to include executable instructions for reading or modifying XML data and may need to include executable instructions that update synchronization data by following the rules associated with SSE—including knowing when and how to update version numbers, how to maintain update histories, and so on. Furthermore, there may in some cases be little or no latitude for errors or different interpretations of operations involving the update of synchronization data: if an endpoint modifies the synchronization data in a way that does not conform to the required organization or layout, that endpoint may not be able to share or synchronize data, and may in some cases even prevent or make more difficult the sharing or synchronization of data between other endpoints.

Turning now to FIG. 1, shown therein is an exemplary system 100 in which item management functionality may be used or implemented. The exemplary system 100 contains endpoint A 110, endpoint B 120, endpoint C 130, and endpoint S 140. Each endpoint might represent any number of general-purpose or dedicated computers, including desktop computers, server computers, laptop computers, workstation computers, mobile or cellular telephones, connected personal digital assistants (PDAs), and the like. At least some of the exemplary endpoints are shown as connected using some exemplary communication means 115. Furthermore, at least some of the exemplary endpoints are shown as including an exemplary application, such as the application A 112 and the application B 122. Some endpoints include an exemplary storage module, such as the storage module A 114, the storage module B 124, and the storage module C 134. An exemplary item management module 126 is shown as being associated with endpoint B 120. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally, a sharing or synchronization relationship may exist between two endpoints. A particular sharing relationship generally relates to a set of data comprising one or more data items, or simply "items."

An endpoint in a sharing relationship may be a publisher, a subscriber, or both a publisher and a subscriber. A publisher may generally make available a "feed" that contains information associated with the items being shared as part of the sharing relationship. A subscriber may be an endpoint that subscribes to a feed provided by a publisher. In the case where both endpoints in a sharing relationship are publishers and subscribers, each endpoint may make available a feed to which the other endpoint subscribes.

In a sharing relationship where both endpoints publish and subscribe, each endpoint may make "local" changes to items, where a "local" change may be a change made on the particular endpoint for some reason, including changes made by users, by automated processes, and so on. Then, so the items being shared are kept the same on both endpoints, the local change may be published as part of the feed. Because the other endpoint subscribes to the feed, it may "merge" the changes exposed using the feed with its own local store of items. It may also make local changes of its own, which may then be merged or incorporated by the other endpoint.

It is noted that not all endpoints must both publish a feed and subscribe to a corresponding feed. For example, some endpoints may only publish, but not subscribe, to a feed related to some particular set of data. Such endpoints may publish information about local changes made by that endpoint, but may not incorporate changes made by any other endpoint. Any other arrangement of publishing and subscribing actions may be contemplated or implemented depending on the requirements of the particular scenario or situation. Also note that, in some implementations, a particular set of two endpoints might have more than one sharing relationship if they share more than one set of data. In other implementations, a sharing relationship might be defined to include all of the data shared between two endpoints, even if it includes more than a single set or type of data.

For example, endpoint A 110 or endpoint B 120, or some other endpoint including those not shown, might participate in a sharing or synchronization relationship with, say, endpoint S 140. Endpoint A might make, say, an RSS feed available that contains item data and synchronization data. Endpoint S might access this feed, incorporate or merge changes in the feed into its own store of items, and in turn make its own feed available. Endpoint A might then subscribe to the feed provided by endpoint S and merge changes made by endpoint S. As a further example, in other cases, one endpoint may act on behalf of another endpoint by, for example, providing or accessing feeds. For example, endpoint A and endpoint S might participate in a sharing relationship, but endpoint S might actually access or be provided a feed from endpoint B, instead of from endpoint A.

It should further be noted that while in some implementations a sharing relationship might exist between two endpoints, it is also possible for a particular set of items to be shared and synchronized with any number of endpoints. This may be accomplished through a variety of arrangements or topologies of endpoints. As just one example, a set of some number of endpoints might synchronize with a particular endpoint, and that particular endpoint might then synchronize with one or more additional endpoints that do not synchronize information directly with the original set of endpoints. In at least some of such cases, or other cases, information may be synchronized throughout the entire "mesh" of synchronizing endpoints.

Endpoint A 110 and endpoint S 140 are shown in the system 100 as being connected by an exemplary communications means 115. Generally, endpoints may be connected by any means by which data may be transmitted, including any type of network or any other kind of transfer, including the transfer of physical media, like a compact disc (CD) or flash memory drive. Furthermore, while in the system 100 some endpoints are not shown as connected by the communication means 115, in some implementations additional or all endpoints may be connected by such communications means, or by other communications means. Endpoints might also be connected directly.

Any endpoint may subscribe to and publish a variety of feeds, and the feeds may be represented using different formats, as introduced previously. Furthermore, items obtained from a feed that is represented using a particular format need not be published or further distributed using a feed or feeds that use that same format—items may be published in any format supported or understood by the publisher. For example, an endpoint might subscribe to one feed that uses RSS and another feed that uses Atom. That same endpoint may then publish the same set of data, or any other set of data, using RSS, Atom, or any other type of feed format, independent of how the data was originally obtained or represented.

In some implementations, including those that may not use functionality like that provided by the exemplary item management module 126, an endpoint in a sharing or synchronization relationship might itself generate or update a feed used in a synchronization relationship. For example, a user might use application A 112 to modify some data that is in turn being shared and synchronized by endpoint A, perhaps with endpoint S. In order for the change made by the user to be made available to endpoint S, endpoint A might need to update the feed with the changed item information, as well as with changed synchronization information. In an implementation that uses SSE, the synchronization information in the feed might be updated, for example, by following a procedure such as that described below with reference to FIG. 6. In such an example, or in other examples, endpoint A might update an XML document that embodies the feed by, among other things, updating a "version" attribute with a new version number, by modifying an update history associated with the item by creating new XML elements, and so on.

However, in the same or other implementations, endpoint A may not itself update the feed with which it shares information with some other endpoint. Instead, it may use functionality provided by, for example, an item management module, such as the exemplary item management module 126. To update an item in the feed, endpoint A might communicate, for example, an "update item" request to the item management module. Such a request might include information like an identification of the feed to be updated and the item information to be modified. The item management module might then update the feed appropriately, conforming to the organization and rules defined for the synchronization techniques in use. Endpoint A might then retrieve or be provided with the updated feed, and it might then make the feed available to other endpoints with which it has sharing relationships. In such an implementation, endpoint A may participate in a sharing relationship without necessarily having the capability of modifying, updating, or generating its own feeds of data. Instead, such operations may be performed by, for example, an item management module, on behalf of some other endpoint, like endpoint A. In at least some implementations, an item management module may be associated with at least some operations described below in more detail with reference to FIG. 2, and described especially with reference to, for example, operation 230.

The information that is shared between endpoints as part of a sharing relationship may be stored in a variety of manners and locations. In at least one implementation, an endpoint that uses an item management module, such as endpoint A 110, might store the shared data locally or in some location that is not associated with the item management module. Such storage may in some cases be represented by the storage module A 114, which might be one or more disk drives or magnetic or other storage devices, or any other mechanism by which data may be stored. Such other mechanisms may include storage devices that are not part of the same endpoint as endpoint A and that may be accessed, for example, using a network or other communication means.

In some implementations, an endpoint might store data that is shared using something like a database, or other storage mechanism, and might generate a feed dynamically or at particular times. In the same or other implementations, an endpoint might store the feed itself (perhaps by storing an XML file in the case of an RSS feed, or the like).

When an endpoint such as endpoint A 110 stores shared data using an associated storage module, like storage module A 114, or in other implementations, the endpoint may communicate the data to the item management module. For example, when endpoint A communicates an "update item" request to the item management module, endpoint A might also include an XML feed document that embodies the feed in which the item update should be performed. In such an example, the item management module might perform the item update and return or make available an updated feed document. In another example, endpoint A might communicate a reference to the feed, which the item management module might use to retrieve or access the feed.

In yet another example, an endpoint such as endpoint A might not store the shared data or feed in a storage module associated with the endpoint. Instead, the endpoint might rely on storage provided by some other endpoint including, in some examples, by an endpoint that also provides item management functionality. For example, endpoint B might include storage module B 124, which might store shared data, perhaps in the form of XML feed documents, or in some other form (such as rows in a database, files in a file system, and so on). In such an implementation, an endpoint that wants to use the item management module might not need to provide the data on which the item management module operates —instead, the endpoint might only need to provide, for example, some way for the item management module to identify the data on which to operate. For example, endpoint A might provide an identifier—such as, perhaps, an ID value—that is associated with a data set or feed stored in storage module B 124. In such an example, the item management module 126 might operate on the data locally, after which endpoint A might retrieve an updated feed, for example, from endpoint B.

In the same or other implementations, endpoint B might itself make a feed available for sharing and so take part in a synchronization relationship with another endpoint, such as endpoint S 140. Such a feed might be accessible at, for example, a feed URL associated with endpoint B. In such cases, an identifier provided to the item management module by another endpoint, such as by endpoint A, might be the feed URL itself. The item management module might use this feed URL to identify, and perhaps also to access the feed and perform the requested operation.

In the same or other implementations, a feed might be provided by yet another endpoint, such as by endpoint C 130. In this or other examples, endpoint C might store the feed, or data used to generate the feed, in a storage module C 134. In such an arrangement, for example, endpoint C might be part of a sharing relationship with, say, endpoint S 140. That is, endpoint S might retrieve a feed from endpoint C, merge changes from the feed into a store maintained by endpoint S, and so on. Although not required, endpoint C might in some implementations be an "SSE Service" or the like, in that it may accept feeds that contain changes from other endpoints, might incorporate those changes into its local data store, and might then make an updated feed available to subscribing endpoints, such as, perhaps, endpoint S. In some implementations, endpoint C might accept, for example, an HTTP POST request to one URL per feed, where the POST request includes a feed with changes; merge the changes in the feed into its own data; and then make an updated feed available by responding to HTTP GET requests communicated to the same URL.

In such an implementation, an endpoint that has the capability to generate its own feed might be interact with endpoint C 130 directly by submitting modified feeds and retrieving updated feeds. However, the same or other endpoints might also interact with endpoint C through an item management module, such as the exemplary item management module 126. For example, endpoint A might communicate an "update item" request to the item management module, as before, but might identify, directly or indirectly, a feed or data set managed by endpoint C. Rather than updating data locally, the item management module might itself generate a new feed and communicate that feed to endpoint C—perhaps using an HTTP POST, as previously described, or through some other mechanism. The item management module may then, at some subsequent time, retrieve or access an updated feed provided by endpoint C, and may further in some cases provide such a feed, or data from such a feed, to endpoint A. In doing so, the item management module 126, and endpoint B 120, may in some cases be considered to act as an intermediary to or proxy for a communication between endpoint A and endpoint C.

It should be noted that while in at least some of the previous examples, changes were explained as being made by an application on an endpoint that does not include an item management module, such as application A 112, in the same or other implementations, an application might exist on any other endpoint. In some implementations, even the endpoint that includes an item management module might also include one or more applications, such as application B 122.

Figure 2:
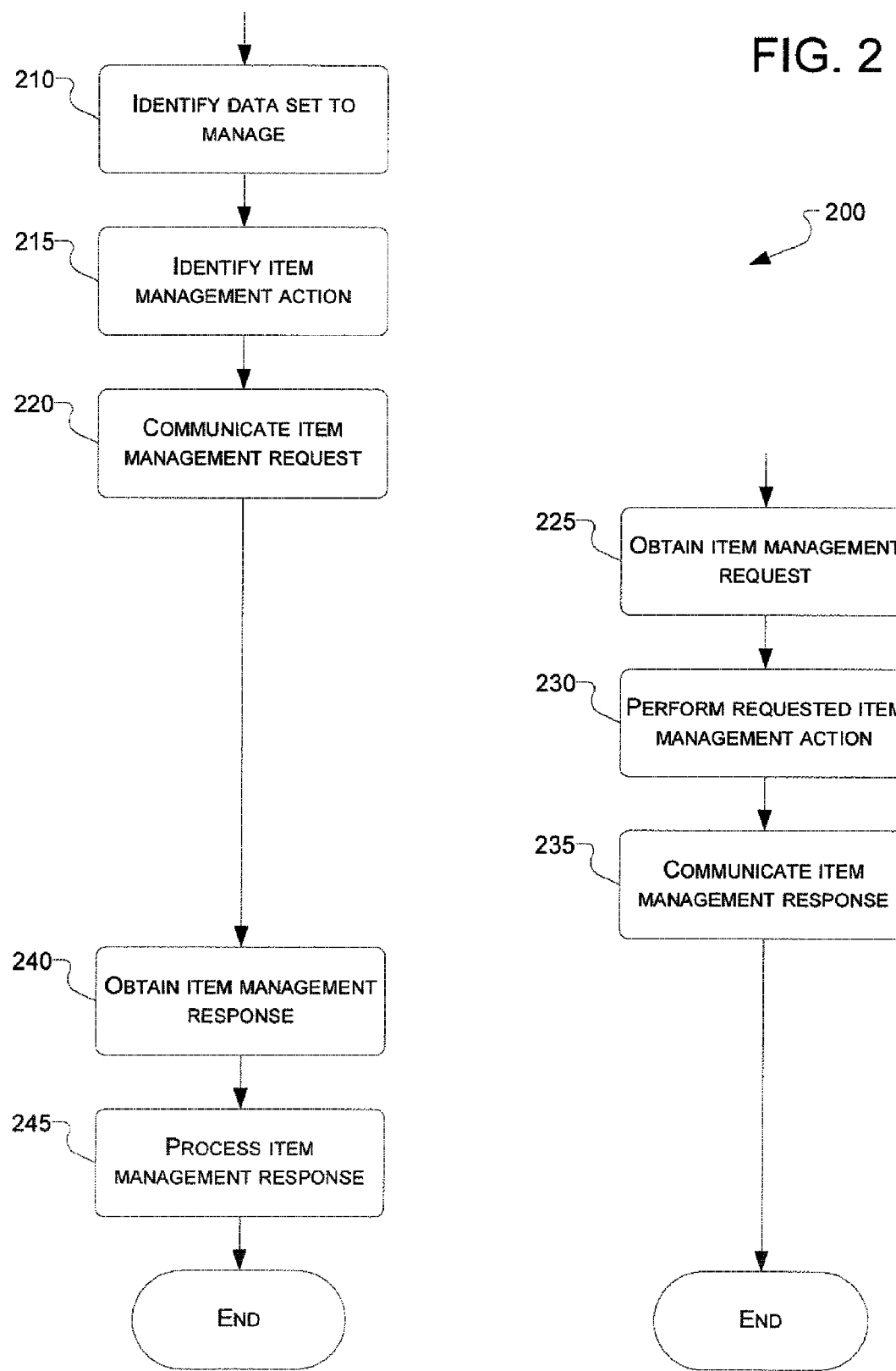
FIG. 2 illustrates an exemplary generalized operational flow that includes operations that might be performed when communicating and responding to an item management request.

Turning now to FIG. 2, shown therein is an exemplary generalized operational flow 200 that includes operations that might be performed when communicating and responding to an item management request. In this context, and as will be described in more detail below, a request might be associated with an item management action such as, for example and without limitation, retrieving a listing of existing items, creating a new item, retrieving information associated with an existing item, updating an existing item, and deleting an existing item. This description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In some implementations, the operations in the "item management client" column—operations 210, 215, 220, 240, and 245—may be performed on an endpoint that uses item management functionality. For example, such operations might be performed on an endpoint like endpoint A 110, described previously with reference to FIG. 1. In at least some implementations, a user interface associated with at least one of these operations may have at least some characteristics associated with the exemplary user interface described below with reference to FIG. 3. In the same or other implementations, the operations in the "item management provider" column—operations 225, 230, and 235—may be performed on an endpoint that includes an item management module. For example, such operations might be performed on an endpoint such as endpoint B 120, also previously described with reference to FIG. 1. In some implementations, both sets of operations may be performed on the same endpoint, while in other implementations, particular operations may be performed on a variety of different endpoints, including on more than two endpoints.

In an exemplary implementation of operation 210, a data set to be managed may be identified. The data set may be considered to comprise or be associated with the items that are shared as part of a synchronization relationship. For example, in an implementation where a synchronization relationship exists that synchronizes contact information, the data set might comprise a set of contacts. In other implementations, the data set might comprise any type or amount of data. In at least some implementations, the data set may be associated with a feed used in a synchronization relationship, where the feed includes synchronization data and item data. In some implementations, such a feed may be the same as or similar to the exemplary feed described below, for example and without limitation, with reference to FIG. 4.

The data set may be identified in a variety of ways depending on characteristics such as, for example, the location or locations in which the data set is stored, one or more properties of the network—like network topology or available bandwidth, and so on. For example, in at least some implementations, a data set may be identified by some reference to a feed used as part of the synchronization relationship itself. The reference might be embodied, in some implementations, as a URL. Such a feed might be managed or accessible through a variety of endpoints, including in arrangements that have been previously described with reference to FIG. 1. For example, in some cases a feed might be provided or accessible through the endpoint on which operation 210 is implemented; in other implementations a feed might be accessible through another endpoint—like through endpoint B or endpoint C; and so on. In other implementations, some other identifying characteristic or characteristics of a data set or feed might be used to identify the data set to manage. For example, an alphanumeric identifier, such as possibly a GUID ("globally unique identifier") might be used in some implementations to identify or map to a particular set of data. In yet other implementations, a data set might be identified through an embodiment of the data in the data set itself. For example, rather than specifying the URL of a feed, a feed document itself—perhaps in XML or some other format—might be used to identify the data set.

Furthermore, identifying information associated with operation 210 may be used in subsequent requests. For example, in some implementations, as part of the first execution of the operational flow 200, an endpoint might create some type of "session" that might in turn be associated with a particular data set. In each iteration of at least some of the operations of operational flow 200, the same session might be used. Such an implementation might enable an endpoint to, for example, first communicate a request to retrieve a listing of existing items, and then communicate a request to retrieve information associated with an existing item, and then finally communicate a request to update the existing item. (The same sequence of successive requests could also of course be implemented without a session.)

In at least some implementations, all or part of operation 210, as well as perhaps other operations, may be accessible to executable code on an endpoint through one or more application programming interfaces (APIs). As just one example, an endpoint might implement all or part of operation 210 and identify a data set to manage by calling a function or method provided by some API. In some cases, the implementation of the API might then interact with the item management module in one or more of a variety of fashions. The endpoint might also perform other operations, such as identifying an item management action, and so on, using the same or other API.

In some implementations of operation 215, an item management action may be identified. In some implementations such item management actions may include, for example and without limitation, retrieving a listing of existing items, creating a new item, retrieving information associated with an existing item, updating an existing item, and deleting an existing item. In the same or other implementations, additional or other item management actions may be identified in this operation.

As part of operation 215, or as part of other operations, any information or data relevant to the identified item management action may be provided. For example, when updating an existing item, such information might include an identification of the item to be updated as well as the data to be used during the update.

In an exemplary implementation of operation 220, an item management request may be communicated to an item management module. The item management request may include a variety of information, including an identification of a data set to manage and an identification of an item management action to be performed by the item management module. In some implementations, the former may have been identified as part of operation 210 and the latter may have been identified as part of operation 215, while in other implementations such data may have been specified or identified in one or more other fashions or operations.

For example, in at least some implementations where the item management action is associated with one or more items that have item data and synchronization data, at least some of the synchronization data may be communicated or identified for use when implementing the item management action. In one specific example, and without limitation, suppose an item—that is perhaps associated with item data and sync data as described below with reference to FIG. 4—is identified as being associated with an item management action that includes updating the item. In some implementations, an item management request might also include the sync data associated with the item. Such sync data might then be used as part of implementing the request—for example, the item management module might be able to use the sync data as part of determining if the requested update would cause a conflict, or for other purposes.

An item management provider or, in some cases an item management module, may provide one or more "interfaces" or means for accessing the functionality associated with the item management provider. Depending on, among other things, the interface or interfaces used in an implementation of operation 220, the specific form of or data that may be communicated may be different.

In one example, an item management provider may provide one or more programmatic interfaces, including a variety of "web service" interfaces. One of such interfaces might use a protocol like SOAP, another might use a "RESTful" protocol, or one or more of a variety of other web services protocols. When the item management request is communicated using SOAP, at least part of the information communicated in operation 220 may include a SOAP envelope specified in XML. When a "RESTful" form of communication is used, and also when at least some other forms of communication are used, the item management request may be communicated using, for example, a variety of HTTP actions. For example, to retrieve a listing of items or to retrieve information associated with a particular existing item (or items), the request might be communicated using an HTTP GET request, while an item management request to change data associated with an existing item might be communicated using an HTTP POST request, and so on. In yet another example, an item management provider might provide an interface that returns information in a format like JSON ("JavaScript Object Notation"). In such a case, an item management request might be communicated using an HTTP request of some type.

In another example, and in contrast to a programmatic interface as introduced previously, an item management provider may provide an interface that returns some kind or portion of a user interface representation. In some implementations, such a user interface representation may then be displayed or otherwise used by the endpoint that initiates the request. For example, in some cases an endpoint might communicate an item management request as, say, an HTTP GET request to a particular URL, and receive in return an HTML page that includes a user interface appropriate to the requested item management action. For example, if the request is to list existing items, a reply might include an HTML page with markup that, when rendered, displays the items. In other implementations, a user interface representation may be communicated in any of a variety of formats, as long as the user interface representation includes data that, when rendered, may display a user interface. In contrast to at least some programmatic interfaces, where data returned may need to be processed in some form before it is displayed, a user interface representation may generally be rendered by, for example, a display processing module or rendering module.

In an exemplary implementation of operation 225, an item management module may receive an item management request from an endpoint. The manner in which this operation is implemented may vary depending on characteristics such as the interface used by the requesting endpoint, and so on. The received request may in some cases include one or both of identification of an item management action and some type of identification of a data set to manage and on which the item management action may be performed. This information may be identified and provided in a variety of ways, including in manners such as those described previously with reference to operation 210, operation 215, and operation 220, and may in other implementations be identified or provided in different ways.

In at least one exemplary implementation of operation 230, the requested item management action may be performed. The manner in which this operation may be implemented, and the resulting operations that may be executed in an implementation of operation 230, may vary depending on characteristics such as the requested action, the manner in which the data set is identified and accessed, the way in which the request was communicated and in which the response may be communicated, and so on.

For example, if the requested item management action is to retrieve a list of the items in the data set or to retrieve specific item information for one or more items in the data set, an implementation of this operation might query or otherwise access information about the identified data set. In one implementation, such an operation might be performed by, for example, querying a database; in another example, the operation might be performed by retrieving information from a file, including perhaps an XML representation of the data set; and so on. Furthermore, in some implementations, the information about the data set might reside or be associated with the endpoint on which, for example, this operation is being executed, while in other implementations the data may be stored or accessible through some other endpoint. Just one example where data may be available elsewhere is the relationship described previously with reference especially to endpoint B 120 and endpoint C 130, both of FIG. 1. In such an example, endpoint B might access a data set managed by endpoint C through, for example, HTTP GET and HTTP POST requests that exchange feed documents.

As another example of how a requested item management action might be performed, if the requested action is to update or add to the data set, the item management module might perform the appropriate operations on the data set. This might involve updating information in database, updating one or more files, communicating an HTTP POST request with an updated feed, and so on. Such operations might be performed when, for example, the requested item management operation is to create a new item, update an existing item, or to delete an existing item.

In at least some implementations, part of performing the requested item management operation may include executing operations defined or specified by one or more synchronization techniques related to a feed associated with the identified data set, and used as part of a synchronization relationship. For example, when the item management action is to create a new item, in some implementations at least some of the operations described below with reference to FIG. 5 may be performed, including defining a new item data element and a new sync data element in a feed. Similarly, when the requested item management action is to update an existing item or in some cases to delete an existing item, at least some of the operations described below with reference to FIG. 6 may be performed, including operations like incrementing version values, modifying update history, and so on. In at least some of such cases, or in other cases, part of performing the requested item management operation may include updating or modifying synchronization information, or sync data, associated with one or more of the items, including items that are associated with the item management operation, or other items.

In an exemplary implementation of operation 235, an item management response may be communicated from the endpoint associated with the item management module. As before with the request, the manner in which the response may be communicated may vary widely depending on a variety of characteristics including the nature of the request, and so on. For example, in some implementations, the response might comprise an HTTP response to a previous HTTP request, while in other implementations, the response might comprise a response to some subsequent HTTP request, or might comprise some communication initiated by the endpoint on which the item management action was performed, or might comprise some other type of response.

In general and in some cases independent of the way in which the response is communicated, the response itself may comprise a variety of information depending upon, for example, the requested item management action, the degree to which the item management action succeeded (or failed), and so on. For example, if the item management request was for a listing of items, or information about or data associated with a particular item, the response might include one or more of a variety of representations of the requested information. In some cases, this information might be formatted in some type of programmatic fashion, including as perhaps XML in a SOAP document, as JSON data that when evaluated might produce one or more JavaScript objects, and so on. In other implementations, the information might comprise one or more of a variety of user interface representations, including HTML, as introduced previously. In the same or yet other implementations, the information might include synchronization information, or sync data, associated with one or more of the items, including items that are associated with the item management operation, or other items.

If the requested item management operation could not be performed or raised or was associated with some type of error, issue, or problem, the response might include information about the issue. In one specific example of such a case, when the item management action is associated with updating information associated with an item, an item management module may in some implementations be able to determine that the requested update operation would result in a "conflict," perhaps because another endpoint had already independently updated the same item. In such a case, in at least some implementations, the item management module might not perform the requested update and might instead notify the requesting endpoint of the potential conflict. The requesting endpoint might then be able to take steps to update the item without actually causing a conflict, including perhaps retrieving updated item information and editing the updated item information. Another mechanism that might be implemented when a requested update operation would result in a conflict might be to perform the update even though it will cause a conflict, and possibly record conflict information so that the conflict may, for example, later be resolved. Yet another mechanism that might be implemented when a requested update operation would result in a conflict might be to perform the update and, in effect, overwrite the previously existing information. Regardless of how the item management module operates when an update might cause a conflict, the initiator of the item management action may or may not be notified of the resulting operation or operations performed by the item management module. (More information about some techniques for identifying and working with conflicts are described below, with reference especially to FIG. 7, FIG. 8, FIG. 9, and FIG. 10.)

In an exemplary implementation of operation 240, the endpoint that initiated the item management request may obtain an item management response, again in a variety of manners and fashions depending on a variety of characteristics and factors, as introduced previously.

Finally, in at least some implementations of operation 245, the item management response may be processed in one or more of a variety of ways. For example, where the response includes a user interface representation, such as HTML, part of processing the response might include rendering or displaying the user interface representation. In implementations where the response includes information represented programmatically, such as in a SOAP document or using JSON, at least part of processing the response might involve retrieving relevant parts of the SOAP data, evaluating the JSON data to create one or more JavaScript objects, and so on. Such information might then be used for a variety of purposes, including to update one or more local or remote data stores, to initiate or participate in a variety of other processes or operations, and so on. The processing of such programmatic data—which may in some cases not be immediately usable to display a user interface—might also ultimately or eventually include displaying a user interface. In at least some implementations, a user interface displayed as part of this operation—as a result of either received user interface representation data or programmatic data—may have at least some characteristics associated with the exemplary user interface described below with reference to FIG. 3.

Figure 3:
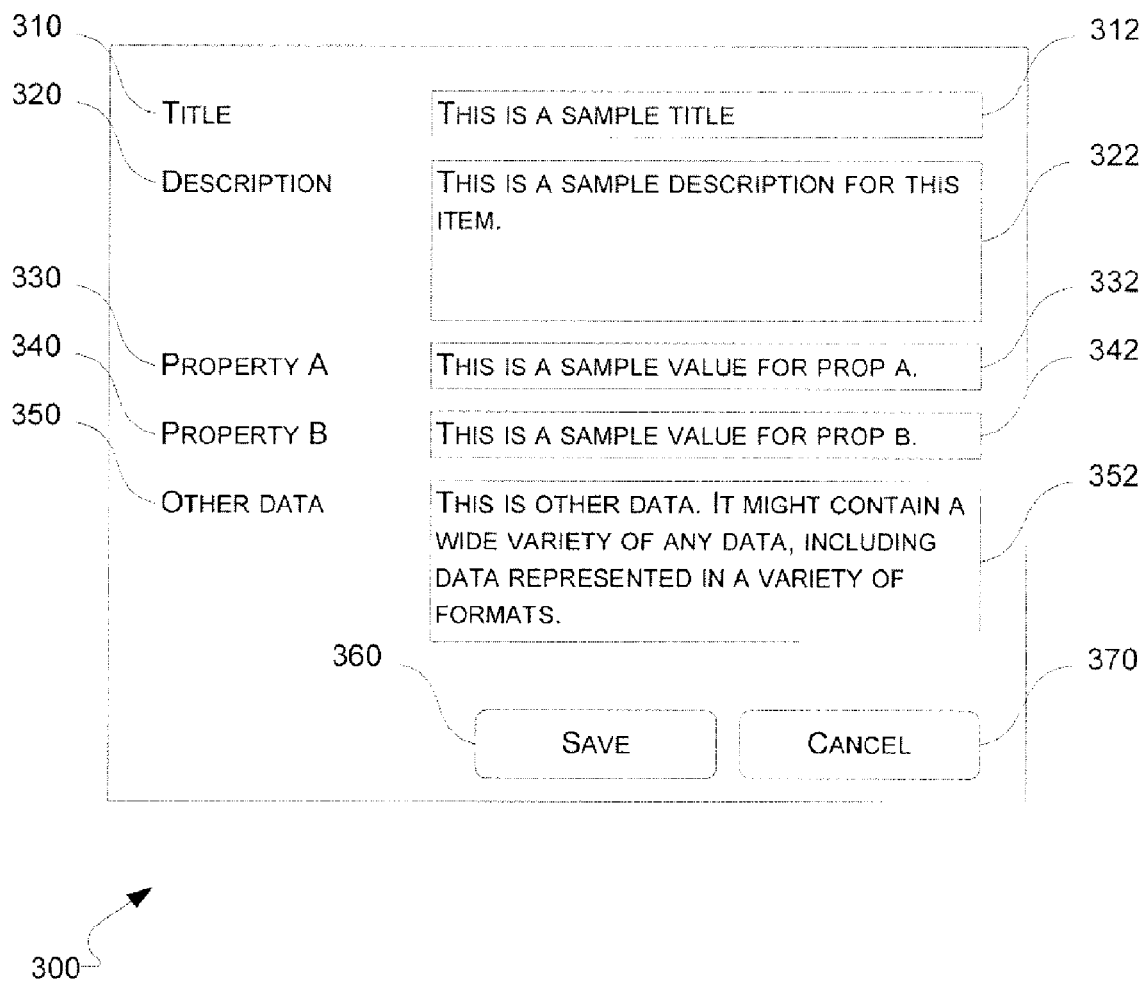
FIG. 3 illustrates one example of a user interface that may be associated with the management of items.

Turning now to FIG. 3, shown therein is one example of a user interface 300 that may be associated with the management of items. This description of FIG. 3 may be made with reference to other figures. However, it should be understood that the elements described with reference to FIG. 3 are not intended to be limited to being used with the elements described with reference to other figures. In addition, while the exemplary diagram in FIG. 3 indicates particular elements, in some implementations not all of these elements may exist, and in some implementations additional elements may exist. Furthermore, it should be understood that the exemplary graphical representations of the systems and user interfaces shown in FIG. 3 are provided only for purposes of discussion, and in no way should be construed as limiting the scope of the techniques described herein to any particular graphical or other representation. Furthermore, the user interface is exemplary and may be implemented in a variety of ways, using a variety of technologies, with a variety of differences from the exemplary user interface, and so on, without departing from the elements of the user interface as described herein.

The exemplary user interface 300 demonstrates just one manner in which an endpoint might display and enable editing of item information. In some implementations, for example, a user interface like user interface 300 might be displayed as part of or as a result of processing an item management response, as was previously described with reference to operation 245 of FIG. 2. In the same or other implementations, the user interface 300 might enable a user to perform operations such as identifying an item management action (as in operation 215), and initiating the communication of an item management request (as in operation 220), perhaps by clicking or pressing a button such as the save button 360. In other cases and implementations, a user interface like user interface 300 might be displayed at other times, for other reasons, and may enable other functionality.

As shown, the exemplary user interface 300 comprises labels 310, 320, 330, 340, and 350; fields 312, 322, 332, 342, and 352; and a save button 360 and cancel button 370.

The labels, as shown, include text such as "title", "description", and so on, but could contain any text, graphic, or other user interface element or elements. Generally in this example, a label may be associated with one or more fields. For example, the label 310 may be associated with the field 312. In this example, and in at least some implementations, at least some of the labels may correspond to, for example, pieces of information associated with a data set or with a feed used in a synchronization relationship. For example, the label 310, with the text "title", might be associated in some implementations with a "title" element (which might in some cases in turn be a child of an "item" element). The associated field, which is field 312 in this specific example, might then display the value of the associated element, or might display some other information or data that is somehow associated with the piece of information or label.

In examples where the feed uses a standard such as RSS or Atom, at least some of the displayed labels and fields may be associated with data that is generally accepted to be part of, for example, an RSS or Atom feed document. Two examples of such data in the case of RSS feeds are "title" and "description" data, because RSS feeds typically include items that have "title" and "description" elements. Feeds may also contain other additional data or elements. In some implementations, it may not be possible for an endpoint to treat this other additional data with any specific processing—in such a case, for example, the endpoint might display such additional data in a general field, such as the field 352 associated with the generic label 350 that in this example contains the text "other data".

In some implementations, a data set or feed may be associated with information that provides organizing or schema data about the data set or feed. Such schema information may be used in some implementations in various ways, including as part of interpreting the "other data" in a feed and, therefore, as part of generating or building a user interface representation that may contain additional information, or in the implementation of an API that might be used by an endpoint.

As just one example, suppose that the information communicated to a requesting endpoint as part of an item management response, or the information in a feed document itself or accessible through some means, contains additional schema information that defines data such as the data type of elements in the feed, a user interface label for one or more elements in the feed, and so on. In such a case, rather than just displaying, for example, standard labels such as "title" and "description" and displaying all other data in a generic field like field 352, an endpoint might interpret the provided schema information and use it to identify additional information about the data. Such additional information might then, for example, be displayed with one or more dedicated labels or fields, or used in a variety of other ways. In the exemplary user interface 300, both the label 330, with the text "Property A", and the label 340, with the text "Property B", and both associated fields 332 and 342, might have been identified using schema or other organizing information associated with the data set or feed in some fashion. Using this information, executable code associated with the user interface may have been able to determine, for example, that a user interface label for a particular piece of data could use the text "Property A", may have been able to determine how to retrieve the associated data from the data in the feed (in this case, the associated data might be "This is a sample value for Prop A."), and so on.

The same schema information may be used as part of providing an API to, for example, an endpoint that receives item management responses. Instead of requiring that the endpoint interpret or parse, for example, all of the "other data" on its own, schema or organizing information may be used in the implementation of an API so that code that might execute on or be associated with an endpoint might use the API to access specific additional fields, such as "Property A" and "Property B", by name, for example.

In at least some implementations, particular user interface elements in an exemplary user interface like the user interface 300 may be associated with the initiation of, for example, additional item management requests. In one implementation, for example, the save button 360 might initiate an item management request to update the displayed item with any changes that have been made using the displayed fields. In the case where at least part of the user interface 300 is communicated as part of an item management response—using HTML, for example—the link between the exemplary save button and the initiation of another item management request might be communicated as part of an initial item management response. That is, for example, the HTML markup that creates the button may be communicated with an associated URL that, when communicated in an HTTP request, comprises at least part of an item management request. In other implementations, including at least some where an initial item management response does not contain a user interface representation, a user interface element like the save button might be created as part of processing programmatic data.

Simple Sharing Extensions

As has been described previously, various operations performed as part of sharing items may be implemented using, among other techniques, one or more extensions to existing feed protocols, including SSE. Some of the following description provides more information about SSE, including exemplary feeds and operations such as additions, modifications, and merges.

Figure 4:
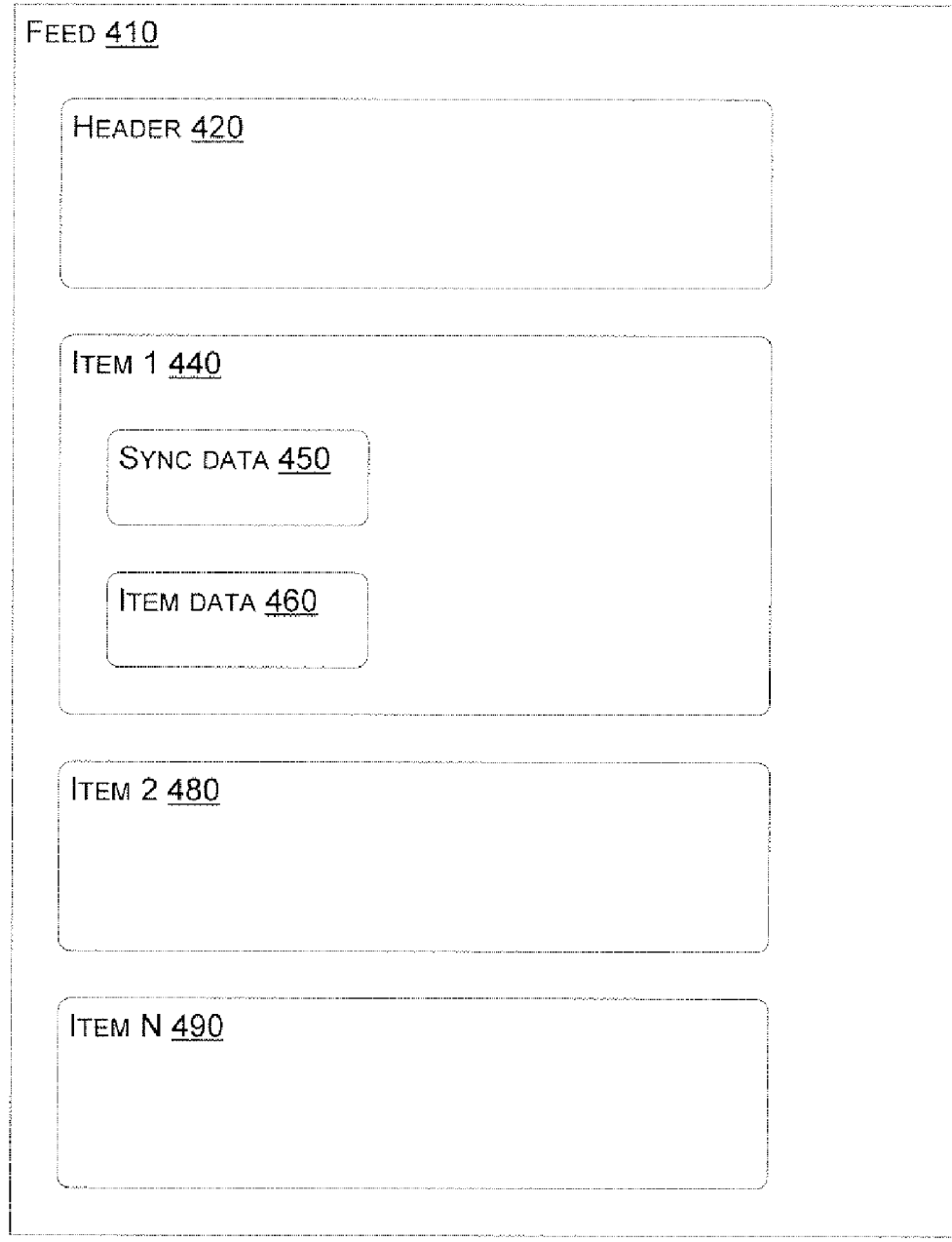
FIG. 4 illustrates an exemplary system that includes an exemplary graphical example of a feed.

Turning now to FIG. 4, shown therein is an exemplary system 400 that includes a graphical example of a feed 410. A feed 410 might contain a header 420 as well as some number of items including, in some examples, item 1 440, item 2 480, and item N 490. Each item might contain sync data 450 and item data 460. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist.

A feed may be represented using any of a wide variety of formats. Generally, however, a feed might contain information necessary to communicate item data and sync data, where item data might be data associated with the particular items being shared as part of the feed and sync data might be additional data required or useful for implementing the synchronization of the items. In some implementations, a feed might use a syndication or data sharing format, such as RSS or Atom. In another example, a feed might use a list-processing format, like Outline Processor Markup Language (OPML). In yet another example, a feed might use some other method for sharing data that does not use XML.

Regardless of the format used by the feed, an exemplary feed 410 may in some cases contain a header with header information that may be general to the entire feed, such as the exemplary header 420. In the case where the feed uses RSS, the header 420 might contain some or all of some standard RSS header elements, such as the "rss" element, the "channel" element, the "title" element, the "description" element, and so on.

The header might also contain data, in some cases also represented using XML elements, such as the data described in the following paragraphs. While this data may be described with reference to XML elements, XML attributes, RSS, and so on, the use of XML or RSS is not required. A header, or the entire feed for that matter, may contain some or all of this data and may represent the data in a variety of formats. For example, a header represented using RSS might contain an RSS "channel" element and a "sharing" element beneath the "channel" element. The "sharing" element might in turn contain a number of attributes and sub-elements. However, such a representation—using RSS, XML elements, XML attributes, and so on—is provided for exemplary purposes only. The data represented in such an example may also be represented in any of a wide number of alternate formats.

As just one example, the header 420 might contain information like the following:

```
<channel>
    <sx:sharing since="Tue, 1 Nov 2004 09:43:33 GMT"
        until="Fri, 1 Mar 2005 09:43:33 GMT" version="0.92" >
        <sx:related link="http://x.com/all.xml" type="complete" />
        <sx:related link="http://y.net/B.xml" type="aggregated"
            title="Family Contacts (Dads Copy)" />
        <sx:related link="http://y.net/C.xml" type="aggregated"
            title="Family Contacts (Suzys Copy)" />
    </sx:sharing>
        . . .
</channel>
```

In this example, the "channel" element might be the standard RSS "channel" element (other standard RSS header information, like the "title" and "description" elements may exist, and, if so, is not shown). In this example the use of the string "sx:" might indicate a particular XML namespace, perhaps including a namespace related to sharing and synchronizing data as described herein. The use of such an XML namespace prefix may not be required for the sharing of data, except as may be required, for example, by the particular format or formats used to represent the feed. For example, if the feed is represented using XML, one or more namespaces might be used or required.

The header 420 might contain header data like that represented in this example by the "sharing" element including some or all of the "since", "until", and "version" attributes, or the like.

Such data might include a value associated with an attribute like "since", which might represent the date-time from which all items in the feed have been incorporated. In some implementations, a feed might include only the most recent modifications, additions, and deletions within some reasonable time window. In some implementations, these feeds might be referred to as "partial" feeds, whereas feeds containing the complete set of items may be referred to as "complete" feeds. New subscribers to a feed might then initially copy a complete set of items from a publisher before having the ability to process incremental updates. Data like that represented by a "since" attribute might be useful, for example and in addition to other data described herein, as part of an implementation of partial and complete feeds. A partial feed might reference the complete feed, for example, by using one or more links or references in the partial feed. By placing a link to a complete feed, for example, in the channel descriptor, only a reference to the partial feed might need to be distributed to potential subscribers. If such an attribute is not present, the "beginning of time" might be assumed, such that the feed contains the endpoint's complete set of data as of the date-time value represented by the "until" value.

The data might also include a value associated with an attribute like "until", which might represent the last date-time when items were incorporated into the feed. The publisher of the feed might guarantee that the value associated with the "until" attribute will increase if any items in the feed are updated. If this attribute is omitted or blank, the subscriber to the feed might not be able to make assumptions about when the feed was updated.

The data might also include a value associated with an attribute like "version", which might represent the version of a specification—including rules about generating and merging content—that was used when the feed was generated.

In some implementations, the data might also include a value associated with an attribute like "window", which might represent the maximum period of time, in days or some other unit, that might elapse after the value associated with the "until" attribute, before a subscriber is no longer able to synchronize with the feed. Subscribers might use this value to determine the frequency with which they should read a feed, as well as when to read the complete feed in the cases where partial feeds exist. Publishers might use this value for a variety of purposes, including to determine when to remove items from partial feeds, to determine when to actually delete data associated with items that have a "deleted" attribute set to "true", and to determine when to delete items associated with a "resolvedconflicts" element (exemplary "deleted" and "resolvedconflicts" elements are described in more detail below).

In some implementations, one or more pieces of data associated with feeds related to a particular feed might be used. In some cases, like the previously presented example, this data might be represented using one or more "related" elements that are children of a "sharing" element. A "related" element might contain some or all of "link", "title", "type", "since", and "until" attributes, or the like.

Such data might include a value associated with an attribute like "link", which might represent a URL or other reference to a related feed. The data might also include a value associated with an attribute like "title", which might contain a name or description of the related feed.

The data might also include a value associated with an attribute like "type", which might contain as data either "complete" or "aggregated". The value "complete" might be used when the link references a feed that contains a complete set of items associated with the feed. The value "aggregated" might be used when the link references a feed whose contents are being incorporated into this feed by the publisher. In some implementations—for example, in the case where a publisher has aggregated information from other feeds into a larger work—it may be useful for subscribers to see more detailed information about the other feeds. This data might also be used to provide information to subscribing feeds about the feeds of other participants, to which they might also wish to subscribe.

The data might also include a value associated with an attribute like "since", which might represent the starting point of the related feed. If this attribute is omitted or blank, it might be assumed that this is a complete feed. The data might also include a value associated with an attribute like "until", which might represent the ending point of the feed.

In addition to a header 420, an exemplary feed 410 may generally contain one or more item elements, such as item 1 440, item 2 480, and item N 490. Generally, each item element may contain one or both of sync data 450 and item data 460. In an implementation where the feed is provided using RSS, an item, like item 1 440, may be associated with the "item" element defined and used in RSS. (Again, as has been described, feeds may be represented in a wide variety of formats, and are not limited to RSS, XML, or the like.)

When using RSS, as just one example, an item element, like item 1 440, might contain information like the following:

```
<item>
    <sx:sync id="0a7903db47fb0ae8" version="1">
        <sx:history when="Sat, 21 May 2005 09:43:33
        GMT" by="UserXDeviceY"/>
    </sx:sync>
    <title>This is a test title</title>
    <description>This is a test item description.</description>
</item>
```

Item data 460 may generally comprise information related to the item itself. In the previous example, the item data 460 might include the RSS "title" and "description" elements. In another example, if a feed contains an item for each of a specified set of contacts, the item data 460 might generally contain information about a particular contact's name, address, phone number(s), and so on. The item data information might be represented in any of a wide variety of formats. In the case of contact information, for example, the item information might be represented using the hCard standard, the vCard standard, or any other format that contains contact information. It is noted that the item data may be stored in any format and is not limited to, for example, XML, XHTML, or any other standardized method for representing information. If a feed is associated with information typically represented in binary form, like audio data or image data, the item data might include such binary information, and so on. The item data may also be stored outside of the feed. In such an implementation, the feed may reference the item data, perhaps using an element like the RSS "enclosure" element.

Sync data 450 generally comprises information associated with the sharing and synchronization of the associated item data. In some implementations this might include data represented, for example, using a "sync" element that might have some or all of the "id", "version", "deleted", and "noconflicts" attributes, or the like, as well as additional attributes. The sync data 450 might also include elements that are, in some implementations, children of a "sync" element, including, for example and without limitation, "history", "update" (which might be a child of a "history" element), "conflicts", and "resolvedconflicts", and the like, as well as additional elements. In some implementations, items that include a valid sync data element 450, or the like, may be considered to be "configured for sharing," in that they may contain information used when sharing the item between multiple endpoints.

Such data might include a value associated with an attribute like "id", which might represent the identifier for the particular item. The value of this attribute may in some implementations be unique within a feed and might also be globally unique across feeds if an item is being shared or synchronized. In some implementations, the value of this attribute might be assigned by the creator of the item, and should not be changed by subsequent publishers.

Such data might also include a value associated with an attribute like "version", which might represent the modification sequence number of the item. In some implementations this value might start at "1" and increment by one indefinitely for each subsequent modification.

Such data might also include a value associated with an attribute like "deleted". Such an attribute, if present and when the associated value is "true", might indicate that the associated item has been deleted and that the remaining data is a "tombstone" useful, for example, to propagate deletions. If this attribute is not present, or if it is present with value of "false", then the item might be considered to not be deleted.

Such data might also include a value associated with an attribute like "noconflicts". Such an attribute, if present and when its associated value is "true", might indicate that particular parts of conflict processing, including perhaps conflict detection and conflict preservation, should not be performed for the associated item. Some possible implementations associated with conflict processing are described below. If this attribute is not present, or if it is present with a value of "false", then it might indicate that conflict processing should be performed for the item.

In addition to attributes that might be used with a "sync" element, or the like, some implementations may maintain a chronological change history for an element, possibly through the use of an element that is a child of the "sync" element, and that might, in some implementations, have the name "history". In some implementations, such an element might have some or all of "when" and "by" attributes, or the like, as well as additional attributes. A "history" element might also, in some implementations, sometimes have one or more "update" elements as children, as well as additional elements. An exemplary "update" element is described in more detail below.

Information associated with a change history might include a value associated with an attribute like "when", which might represent the date-time when the most recent modification of the associated item took place. If this attribute is omitted the value might default to the earliest time that can be represented using, for example, the date format specified by the Internet Engineering Task Force (IETF) RFC 822.

Such data might also include a value associated with an attribute like "by", which might identify the unique endpoint or entity that made the most recent modification. In some implementations, the associated value might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

In some implementations at least one of the "when" or "by" attributes must be present—in such implementations it may be invalid to have neither.

In some implementations, some parts of an item's change history might be maintained through the use of an "update" element, or the like, as part of the item's sync data 460. In some of these implementations, each "update" element might represent a distinct update operation applied to the associated item. In some implementations a new "update" element might be created each time the item is updated.

As just one example, the following XML fragment might indicate that the particular item was modified on May 21, 2005—as is indicated by the "update" element—and then modified again, more recently, on May 23, 2005—as is indicated by the "history" element:

```
<item>
    <sx:sync id="0a7903db47fb0ae8" version="1">
        <sx:history when="Mon, 23 May 2005 09:43:33
        GMT" by="UserXDeviceY">
```

-continued

```
            <sx:update when="Sat, 21 May 2005 09:43:33
            GMT" by="UserXDeviceY" />
        </sx:history>
    </sx:sync>
    <title>This is a test title</title>
    <description>This is a test item description.</description>
</item>
```

In some implementations, an "update" element might have one or both the "when" and "by" attributes, as well as other attributes.

Such data might include a value associated with an attribute like "when", which might represent the date-time when the modification associated with this update took place. If this attribute is omitted the value might default to the earliest time that can be represented using, for example, the date format specified by IETF RFC 822.

Such data might also include a value associated with an attribute like "by", which might identify the unique endpoint that made the modification associated with this update. In some implementations, the value of this attribute might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

Like with the "history" element, in some implementations, at least one of the "when" or "by" attributes must be present—in such implementations it may be invalid to have neither.

Another set of elements that might be part of an item's sync data 450 might be a conflict collection and a resolved conflict collection, perhaps represented using a "conflicts" element and a "resolvedconflicts" element, or the like. Both of these elements might be used, for example, as part of a conflict preservation implementation. Such an implementation might preserve, for example, the "losing" change when two changes conflict. Some examples of conflict preservation implementations are described below, for example, with reference to FIG. 7, FIG. 8, FIG. 9, and FIG. 10.

Figures 5, 6:
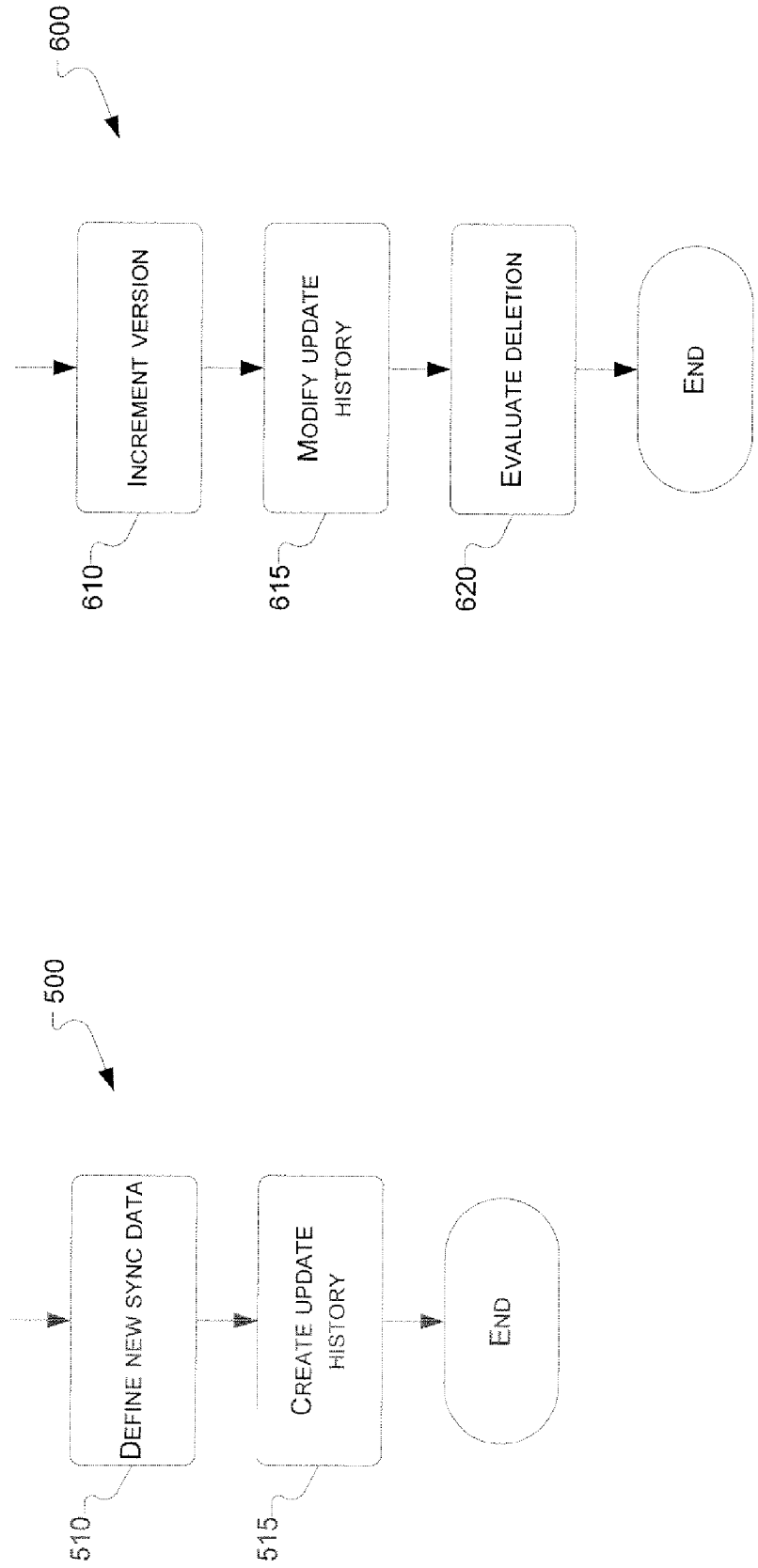
FIG. 5 illustrates an exemplary generalized operational flow including various operations that may be performed when modifying an item to include sharing and synchronization data.
FIG. 6 illustrates an exemplary generalized operational flow including various operations that may be performed when performing a local update of an item.

Turning now to FIG. 5, shown therein is an exemplary generalized operational flow 500 including various operations that may be performed when modifying an item to include sharing and synchronization data. The following description of FIG. 5 may be made with reference to other figures. However, it should be understood that the operational flow described with reference to FIG. 5 is not intended to be limited to being used with the elements described with reference to these other figures. In addition, while the exemplary operational flow of FIG. 5 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

The operations described in the exemplary operational flow 500 may generally be performed when an item that has not previously been configured for sharing or synchronization is to be shared. One example of when such operations might be performed is when a new item is created as a result of a local user operation. For example, if a user is synchronizing her contact information and creates a new contact, the operations described with reference to FIG. 5 might be performed so that the contact contains the minimum set of sharing information necessary for the sharing of that contact. Another example of when such operations might be performed might be when a set of items that already exists but that is not configured for synchronization is extended to support sharing and synchronization.

In one example of operation 510, new sync data may be defined. This new sync data might include, for example, a unique identifier and an initial version value. In some cases the initial version value may be a starting version of "1". Further, in implementations that, for example, generate a feed that is represented using XML, this operation might result in the creation of a new "sync" element, or the like, or the definition or creation of data that ultimately results in the creation or generation of a "sync" element when a feed is generated. In such implementations, or in other implementations, the unique identifier data might be associated with an "id" attribute and the version information might be associated with a "version" attribute.

In an exemplary implementation of operation 515, an update history may be created. The newly created update history may contain information about this initial update, perhaps specified using one or both of values that define when the information was defined and by whom the information was defined. In implementations that, for example, generate a feed that is represented using XML, this operation might result in the creation of a new "history" element, or the like, or the definition or creation of data that ultimately results in the generation of a "history" element when a feed is generated. In such implementations, or in other implementations, the time when this information was defined might be associated with a "when" attribute and the entity that defined this information might be associated with a "by" attribute.

As just one example, consider the following RSS item, represented using XML, as it might exist before the operations of the exemplary operational flow 500 are performed:

```
<item>
    <title>This is a test title</title>
    <description>This is a test item description.</description>
</item>
```

After the operations of the exemplary operational flow 500 have been performed, the same item might be represented in a feed as follows:

```
<item>
    <sx:sync id="0a7903db47fb0ae8" version="1">
        <sx:history when="Sat, 21 May 2005 09:43:33
        GMT" by="UserXDeviceY"/>
    </sx:sync>
    <title>This is a test title</title>
    <description>This is a test item description.</description>
</item>
```

In some implementations, the information defined by the operations of the exemplary operational flow 500 might be considered to form at least part of the sync data 450 described previously with reference to FIG. 4. In the same or other implementations, the item data that existed before the execution of the exemplary operational flow 500 might be considered to form at least part of the item data 460 also described previously with reference to FIG. 4.

Turning now to FIG. 6, shown therein is an exemplary generalized operational flow 600 including various operations that may be performed when performing a local update of an item. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

A local update, as performed by the operations of the exemplary operational flow 600, may be defined as an update that is performed outside of a merge operation. Such a local update may include both the modification of an item—for example, this might include the modification of a contact's address or phone number in a contact item—as well as the deletion of an item. For example, when a user uses an application to modify data that is ultimately shared as part of a feed, at some point a local update may be made to the data in the feed associated with the change made by the user.

In an exemplary implementation of operation 610 the version data associated with the item may be incremented, for example, by one. In implementations that, for example, generate a feed that is represented using XML, this operation might result in a change to the value associated with a "version" attribute. If the previous value of the version attribute was "1" a new value might be "2", and so on.

In one implementation of operation 615, the update history of the item might be modified so as to capture information about when this particular modification takes place and also, in some implementations, to maintain at least some information about previous modifications. One possible implementation of this operation might involve first creating a new "update" element, or the like, as the first member of the existing update history (in doing so, any previously existing update information might be moved down in order). Note that, as has been previously stated, while this operation, and others, may be described in some cases in the context of concepts related to XML including, for example, elements and attributes, these descriptions are in no way limiting to an implementation that only uses or results in XML data. For example, in some implementations an update history, including the information described as residing, in some implementations, in "history" and "update" elements, might be created and maintained in memory, using database records or other data structures, and the like. In any implementations, the relevant information may never be stored, persisted, or communicated as XML. Some of the descriptions provided herein use XML concepts only for ease of explanation.

To set the values of the "when" (modification time) and "by" (modifying entity) attributes of the new "update" element, operation 615 might copy the corresponding data from the current "history" element. In doing so, data about the most recent previous modification—which may have been previously recorded with "when" and "by" values in the "history" element—may now be saved in the new "update" element, and so may not be lost if the data associated with the "history" element is updated.

In some implementations, operation 615 may truncate the update history by deleting some or all of the "update" elements. In implementations that truncate the update history, the "update" elements may generally be deleted in reverse order of their creation so that older update history is deleted before newer update history.

Finally, operation 615 might set one or both of the "when" (again, modification time) and "by" (again, modifying entity) attributes of the top-level "history" element to the current time and entity making this modification, respectively.

In one implementation of operation 620, further steps may be performed in the case where the modification is a deletion of the item. When this is the case, in some implementations the "deleted" attribute of the top-level "sync" element may be set to "true". In some implementations, the data associated with the item may also be physically deleted. However, in at least some implementations the top-level "item" element as well as the "sync" element and its children might be retained. (In implementations that use the concept of partial feeds, the actual "item" and "sync" element may be physically deleted when allowed, as defined by the "window" attribute of the "sharing" element, and as described previously with reference to FIG. 4.)

As just one example, consider the following RSS item, represented using XML, as it might exist after having been modified three times in sequence, once per day, by the same endpoint:

```
<item>
    <sx:sync id="0a7903db47fb0ae8" version="4">
        <sx:history when="Tue, 24 May 2005 09:43:33
        GMT" by="UserXDeviceY">
            <sx:update when="Mon, 23 May 2005 09:43:33
            GMT" by="UserXDeviceY" />
            <sx:update when="Sun, 22 May 2005 09:43:33
            GMT" by="UserXDeviceY" />
            <sx:update when="Sat, 21 May 2005 09:43:33
            GMT" by="UserXDeviceY" />
        </sx:history>
    </sx:sync>
    <title>This is a test title</title>
    <description>This is a test item description.</description>
</item>
```

In this example, the execution of the exemplary operational flow 600 three different times has resulted in the creation of three "update" elements that represent the time at which the modification took place and the entity that made the modification.

If this particular RSS item is modified again two more times, once per day, and the particular implementation only maintains the most recent three versions, the resulting item might look as follows, represented as XML:

```
<item>
    <sx:sync id="0a7903db47fb0ae8" version="6">
        <sx:history when="Thu, 26 May 2005 09:43:33
        GMT" by="UserXDeviceY">
            <sx:update when="Wed, 25 May 2005 09:43:33
            GMT" by="UserXDeviceY" />
            <sx:update when="Tue, 24 May 2005 09:43:33
            GMT" by="UserXDeviceY" />
            <sx:update when="Mon, 23 May 2005 09:43:33
            GMT" by="UserXDeviceY" />
        </sx:history>
    </sx:sync>
    <title>This is a test title</title>
    <description>This is a test item description.</description>
</item>
```

Figure 7:
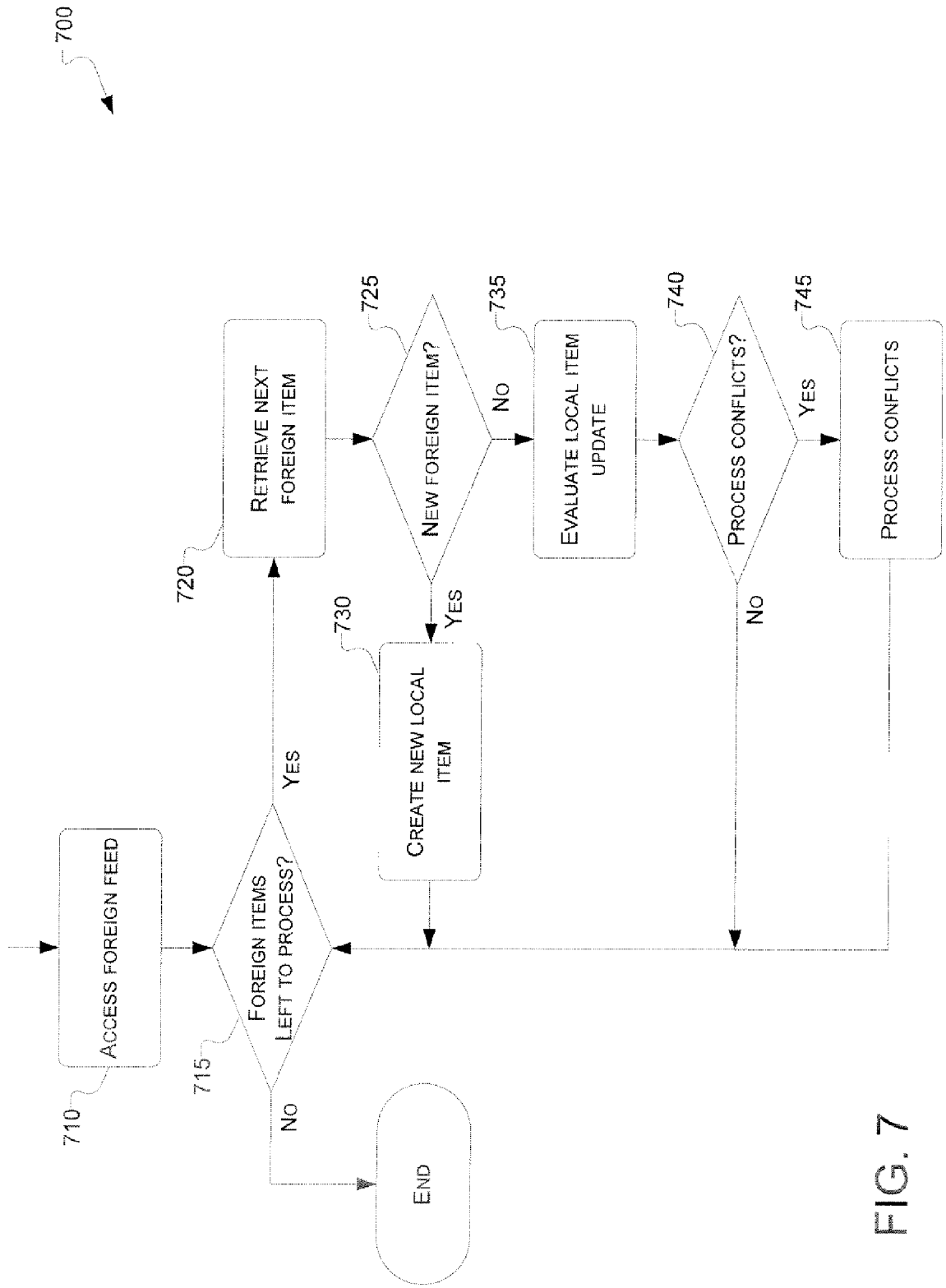
FIG. 7 illustrates an exemplary generalized operational flow that includes various operations that might be performed when merging changes made by another endpoint with the data maintained by a local implementation of an endpoint.

Turning now to FIG. 7, shown therein is an exemplary generalized operational flow 700 that includes various operations that might be performed when merging changes made by another endpoint with the data maintained by a local implementation of an endpoint. The following description of FIG. 7 may be made with reference to other figures. However, it should be understood that the operational flow described with reference to FIG. 7 is not intended to be limited to being used with the elements described with reference to these other figures. In addition, while the exemplary operational flow of FIG. 7 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 710, a foreign feed that contains information about the items synchronized between two endpoints may be accessed. In some embodiments, a foreign feed may be made up of items that each may contain item data and sync data, for example, perhaps as further described previously with reference to FIG. 4. In some implementations, the foreign feed may be the feed provided by one endpoint, such as, in particular implementations, by endpoint A 110, endpoint B 120, endpoint C 130, or endpoint S 140, all of FIG. 1, when a second endpoint in a sharing relationship obtains that feed and merges its changes into the second endpoint's local data.

In general, a foreign feed may be provided in some fashion by another endpoint. For example, the operation of accessing the foreign feed may in some implementations involve using a network to physically retrieve a file or files that contain the foreign feed. Because the mechanism by which the foreign feed is accessed or transmitted may be irrelevant to the operation of the steps illustrated with reference to FIG. 7, this step may also encompass any other means by which a foreign feed may be accessed, including manual transfer of data using some other form of storage including a CD, a flash drive, a physical printout of data on paper, and so on. A particular foreign feed may not necessarily contain all of the items synchronized by a particular endpoint—for example, an endpoint may synchronize with multiple foreign feeds, each which may contain the same or a different set of items.

It should be noted that while some of the preceding and following description may refer to the foreign feed as, for example, an XML document that contains item and sharing information perhaps like that described elsewhere in this specification, the foreign feed is not so limited. For example, the foreign feed may not necessarily always be provided as an XML document. Any feed provided by another endpoint that contains item and sharing information may possibly be accessed or used as described in this operation and the operational flow 700.

In at least one implementation of operation 715, it may be determined if the foreign feed contains any foreign items that have not yet been processed. In this context, the term "foreign item" may refer to an item defined by the foreign feed, in contrast to a "local item," which may refer to an item stored or managed by the entity that accesses the foreign feed, including, in some implementations, the entity or entities that execute the operational flow 700. If there are no remaining foreign items to process, the operational flow ends. If the foreign feed contains at least one item that has not yet been processed, the exemplary operational flow proceeds to operation 720.

In an exemplary implementation of operation 720, the next foreign item is retrieved from or identified using the foreign feed. For example, if the foreign feed is associated with five foreign items, the first time operation 720 is executed, one of these items may be retrieved. The next time operation 720 is executed, another of these items may be retrieved, and so on. This may continue until all foreign items have been retrieved, at which point operation 715 stops any further retrieval.

In at least one implementation of operation 725, it is determined if the current foreign item—that is, the foreign item retrieved in the most recent execution of operation 720—is a new item that the endpoint performing the exemplary operational flow 700 has not yet evaluated. In some implementations, this operation may be performed by determining if a data store that contains local items and is managed or accessible from the local endpoint contains an item that has the same unique identifier as the current foreign item. If no such local item exists, the foreign item may be determined to be new, and the operational flow may proceed to operation 730. If the local data store contains an item with the same unique identifier as the foreign item, the foreign item may not be considered new, and the operational flow may proceed to operation 735.

If the foreign item is new, the operational flow may proceed to operation 730 where, in an exemplary implementation, data from the foreign item may be used to create a corresponding local item. The implementation of this operation may vary according to different factors including how, for example, local items are stored. In some implementations, this operation may be performed by creating a new database record or records, a new data structure or data structures, and so on, and setting the rows, fields, or the like by copying information from the foreign item. In other implementations, this operation may be performed by copying the information from the foreign item into a feed document maintained locally, and so on.

If the foreign item is not new, the operational flow may proceed to operation 735 where, in at least some implementations, data from the foreign item is used to evaluate if and how the corresponding local item should be updated. For example, data from the foreign item may be determined to be more recent than data from the local item, and so may in some cases overwrite the corresponding data in the local item. A number of other operations may occur as part of the evaluate local item update operation. An exemplary implementation of these other operations is described in more detail below, with reference to FIG. 8. It should be noted that, in at least some implementations, data that is overwritten may need to be saved, at least until the remaining operations that relate to this foreign item are performed. For example, an operation related to processing conflicts may use some of the data that might be overwritten as part of operation 735.

In an exemplary implementation of operation 740, it may be determined if it is necessary to process conflicts associated with the foreign item and the local item. If no conflict processing is needed, the operational flow may proceed to operation 715. If conflict processing is required, the operational flow may proceed to operation 745. This determination may be made in a variety of ways, including by, for example, determining if the foreign item, the local item, or both items contain a flag or some other data that indicates if conflicts should be or should not be processed. In some implementations, such a flag might be the "noconflicts" attribute described previously, for example with reference to FIG. 4. In these implementations, if the "noconflicts" attribute exists and is set to "true", no conflict processing may be necessary.

If conflict processing is indicated, the operational flow may proceed to operation 745, where, in an exemplary implementation, potential conflicts between the foreign item and the local item may be processed. The steps executed during conflict processing may vary in different implementations and may include one or both of a conflict detection operation and a conflict preservation option. One implementation of conflict processing operations, such as these, is described in more detail below, with reference to FIG. 9.

Figure 8:
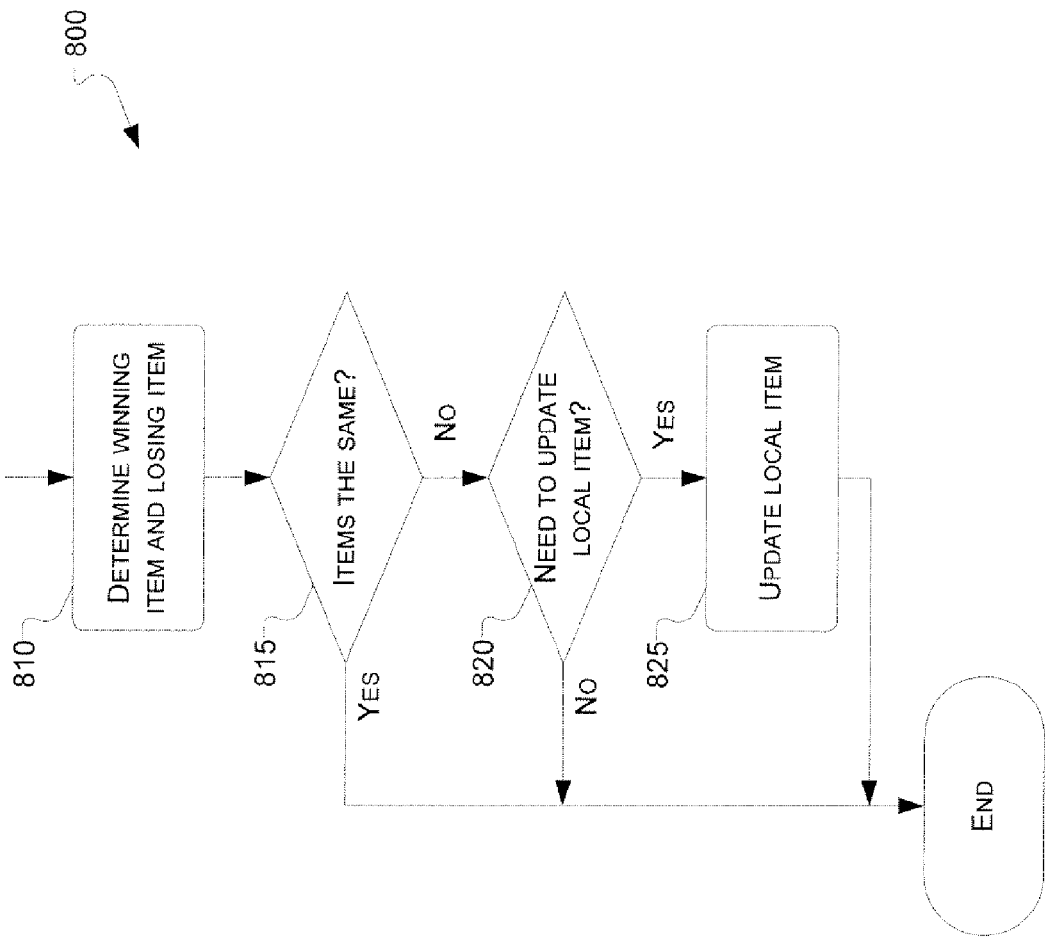
FIG. 8 illustrates an exemplary generalized operational flow that includes operations that might be performed as part of evaluating how a local item might be updated during a merge operation.

Turning now to FIG. 8, shown therein is an exemplary generalized operational flow 800 that includes operations that might be performed as part of evaluating how a local item might be updated during a merge operation. In some implementations, the steps described in FIG. 8 may be used as all or part of an implementation of operation 735 described previously with reference to FIG. 7. This description of FIG. 8 may be made with reference to other figures. However, it should be understood that the operational flow described with reference to FIG. 8 is not intended to be limited to being used with the elements described with reference to these other figures. In addition, while the exemplary operational flow of FIG. 8 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 810, a "winning item" and "losing item" may be determined from two items presented. For example, when the operations in the operational flow 800 are used in the context of the merge operational flow 700 described previously with reference to FIG. 7, the two items presented may comprise the foreign item and the local item identified as part of the merge operational flow 700. One of these items may be selected to be the winning item, which in some implementations is the item that is determined to have precedence, for some reason or reasons, and the other item may be selected to be the losing item. Furthermore, in some cases neither item may be determined to be the winning item or the losing item.

In some implementations, the determination of the winning item and the losing item may be made by comparing data associated with both items. For example, the winning item and losing item may be determined by a comparison of the current version of the items, the most recent time the items were modified, and the entities that performed the most recent item modification. In the case where the items are similar to those described previously with reference to FIG. 4, this data may be determined, for example, using the "version" attribute of the "sync" element, the "when" attribute of the "history" element, and "by" attribute of the "history" element, respectively. In such an implementation, the version data may be compared first, and an item with a greater version number may be determined to be the winning item. If both items have the same version, the most recent modification time may be compared, and the item with the more recent modification time may be determined to be the winning item. If both modifications were performed at the same time (for example, within the same second), then the entities that performed the modifications may be compared, and the item that has the entity with the "greater" value—as determined by text comparison, for example—may be determined to be the winning item. In implementations where the modification time and modifying entity are not necessarily required to be defined for each item, a comparison may determine that a winning item is the item that has data for a particular field—for example, if only one of the items has a modification time defined, that item may be determined to be the winner in a comparison of modification times.

If one item is determined to be the winning item, the other item may be determined to be the losing item. If neither item is determined to be the winning item, then neither item may be determined to be the winning item or the losing item.

In an exemplary implementation of operation 815, it is determined if the items are considered the "same" for the purposes of updating the local item. In one implementation, this operation may use the results of the previous operation 810. If neither item was identified as the winning item in operation 810, then the items may be considered to be the same, and the operational flow 800 may end. If operation 810 determined a winning item and a losing item, then the items may be determined to not be the same, and the operational flow 800 may proceed to operation 820. Note that in some implementations, the determination of whether the items are the same may use only the synchronization data associated with each item—like the version, modification time, and modifying entity—as described above, for example. In these or other implementations, the determination of whether the items are the same may not use item data, like contact information when the item represents a contact, image information when the item represents an image, and so on. This may mean that the item data associated with each of the two items is different even when the items are determined to be the same in this operation, and vice versa.

In at least one implementation of operation 820, it may be determined whether the local item needs to be updated. For example, when the operational flow 800 exists in the context of some other set of operations that provide a foreign item and a local item, like when the operational flow is executed as part of the merge operational flow 700, this operation may determine if the local item should be updated. In some implementations, it may be determined that the local item should be updated if the foreign item was determined to be the winning item. For example, this might be the case if the foreign item had a greater version number than the local item or had a more recent modification time than the local item. If the local item needs to be updated, the operational flow 800 proceeds to operation 825; otherwise, the operational flow ends.

In an exemplary implementation of operation 825, the local item may be updated. The implementation of this operation may vary according to how, for example, local items are stored. In some implementations, this operation may be performed by modifying a database record or records, a data structure or data structures, and so on, that may store data about the local items, by copying data from the foreign item. In other implementations, this operation may be performed by copying information from the foreign item into a feed document maintained locally, and so on. In at least some cases, both the synchronization data and the item data may be copied and used to update the local item. This means that, as a result, the local item now may have the same item data, same update history, same version, and so on, as the foreign item.

Figure 9:
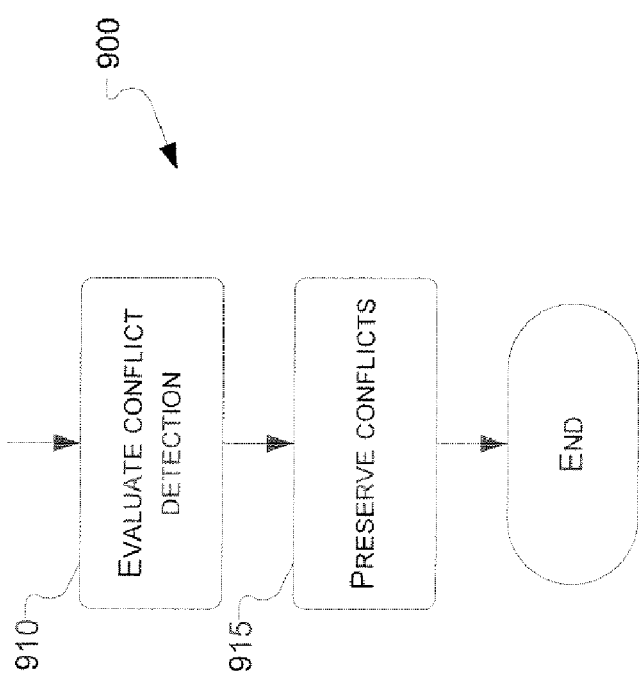
FIG. 9 illustrates an exemplary generalized operational flow that includes operations that might be performed when processing conflicts.

Turning now to FIG. 9, shown therein is an exemplary generalized operational flow 900 that includes operations that might be performed when processing conflicts. In some implementations, the steps described in FIG. 9 may be used as all or part of an implementation of operation 745 described previously with reference to FIG. 7. This description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 910, it may be determined whether the two presented items are in conflict. In this context, the operational flow 900 may be assumed to be operating with two items. Such items may be a winning item and losing item, as identified, for example, by the operations of operational flow 800 described previously with reference to FIG. 8. Such items may also be a foreign item and a local item, as described previously, for example, with reference to FIG. 7. In addition, as used herein, the term "in conflict" may refer to the case where separate modifications were made independently to the same item. For example, suppose the same item is modified by two different endpoints, and neither endpoint knows of the other endpoint's modification at the time the endpoint is making its own modification. Such items might be determined to be in conflict, for example, during a merge operation. When this definition of the term "in conflict" is used, it may be possible for items that have the same item data—for example, for a contact that has the same name, address, phone number(s), and so on—to still be determined to be in conflict. This might occur, in one example, if two endpoints independently modified, say, a phone number field of a contact to the same new phone number. In some implementations, additional processing—not described herein—may be used to determine if items like this are truly different.

One procedure for determining if the two items are in conflict in operation 910 uses information about when and by whom modifications were made. For example, in an implementation that uses data described previously, for example, with reference to FIG. 4, or uses similar data, conflicts may be detected by first identifying the value of the "version" attribute of the "sync" element of the winning item, and defining this value as n. This value may then be decremented by the value of the "version" attribute of the "sync" element of the losing item, and the resulting value stored as an updated n. Then, the values of the "when" (modification time) and "by" (modifying entity) attributes of the losing item's "history" element may be compared with the values of the "when" and "by" attributes of the winning item's "update" element that corresponds to the value of n. If n is zero, then the values of the "when" and "by" attributes of the losing item's "history" element may be compared with the values of the "when" and "by" attributes of the winning item's "history" element.

If the identified "when" and "by" values are the same, or if the "update" element corresponding to n does not exist (when n is greater than zero), the items may be determined to not be in conflict. If the at least one of the "when" and "by" values are not the same, the items may be determined to be in conflict.

As one example of how this implementation of conflict detection might proceed, suppose one endpoint—perhaps called endpoint A—modified an item so the item's representation in a feed was:

```
<item>
  <sx:sync id="0a7903db47fb0ae8" version="3" deleted="false">
    <sx:history when="Thu, 6 Jul 2006 20:27:22
    GMT" by="endpointA">
      <sx:update when="Thu, 6 Jul 2006 20:27:21
      GMT" by="endpointA" />
      <sx:update when="Thu, 6 Jul 2006 20:27:20
      GMT" by="endpointA" />
    </sx:history>
  </sx:sync>
```

-continued

```
        <title>This is a test title, modified by endpoint A</title>
        <description>This is a test item description.</description>
    </item>
```

And suppose another endpoint—perhaps called endpoint B—modified an item so the item's representation in a feed was:

```
<item>
    <sx:sync id="0a7903db47fb0ae8" version="3" deleted="false">
        <sx:history when="Thu, 6 Jul 2006 20:27:23
        GMT" by="endpointB">
            <sx:update when="Thu, 6 Jul 2006 20:27:21
            GMT" by="endpointA" />
            <sx:update when="Thu, 6 Jul 2006 20:27:20
            GMT" by="endpointA" />
        </sx:history>
    </sx:sync>
    <title>This is a test title, modified by endpoint B</title>
    <description>This is a test item description.</description>
</item>
```

As is evident when examining the "history" elements of both items, the "when" attribute of the "history" element associated with the item modified by endpoint B shows a modification time that is one second later than the modification time associated with the change made by endpoint A. Using the previously described operations and procedures, in some implementations the item modified by endpoint B would be determined to be the winning item, and the items would be determined to be in conflict. In terms of the conflict detection procedure, the value of n would be determined to be zero, because subtracting the value of the "version" attribute associated with the losing item ("3") from the value of the "version" attribute associated with the winning item ("3") results in the value of zero. Therefore, the values of the "when" and "by" attributes of the "history" elements associated with both items would be compared, and it would be seen that the values of the "when" attributes were different, therefore indicating that the items were in conflict.

In an exemplary implementation of operation 915, some or all conflict data associated with both items in question may be preserved. In this context, "preserving conflict information" may refer to the preservation of item and synchronization data associated with conflicts. For example, suppose that two items were modified independently and were subsequently determined to be in conflict. Also suppose that the data associated with the winning item was to be used, or was already used, to overwrite the data associated with the losing item. As part of conflict preservation, in some implementations the data associated with the losing item may be preserved. This may lessen or eliminate data loss, and enable, for example, subsequent user intervention to determine if the "correct" data (as defined by a user, for example) was retained.

One procedure for preserving conflicts might use a "conflict collection" and a "resolved conflict collection." In implementations that use feeds that have XML representations, these collections might be implemented as, for example, elements named "conflicts" and "resolvedconflicts". The children of the "conflicts" and "resolvedconflicts" elements may in turn be, for example, one or more instances of "item" elements that existed at some time in losing items. When an "item" element is a member of a conflict collection or a resolved conflict collection, it may be referred to as a "conflict item", "conflict element", "resolved conflict item", or a "resolved conflict element". (Resolved conflicts are described in more detail below, with reference to FIG. 10.)

For example, in the previous exemplary description with reference to operation 910, the item modified by endpoint A was determined to be the losing item. As a result of a conflict preservation operation like operation 915, the data associated with the modification made by endpoint A might be preserved as part of the winning item, and may, for example, appear like the following in an XML representation of the feed:

```
<item>
    <sx:sync id="0a7903db47fb0ae8" version="3" deleted="false">
        <sx:history when="Thu, 6 Jul 2006 20:27:23
        GMT" by="endpointB">
            <sx:update when="Thu, 6 Jul 2006 20:27:21
            GMT" by="endpointA" />
            <sx:update when="Thu, 6 Jul 2006 20:27:20
            GMT" by="endpointA" />
        </sx:history>
        <sx:conflicts>
            <item>
                <sx:sync id="0a7903db47fb0ae8" version="3" deleted="false">
                    <sx:history when="Thu, 6 Jul 2006 20:27:22
                    GMT" by="endpointA">
                        <sx:update when="Thu, 6 Jul 2006 20:27:21
                        GMT" by="endpointA" />
                        <sx:update when="Thu, 6 Jul 2006 20:27:20
                        GMT" by="endpointA" />
                    </sx:history>
                </sx:sync>
                <title>This is a test title, modified by endpoint A</title>
                <description>This is a test item description.</description>
            </item>
        </sx:conflicts>
    </sx:sync>
    <title>This is a test title, modified by endpoint B</title>
    <description>This is a test item description.</description>
</item>
```

In one implementation of a conflict preservation procedure, if a losing item's conflict collection is not empty, any items in a losing item's conflict collection may be copied to the winning item's conflict collection. In this context, the term "identical" may mean that the items have the same values associated with the version, modification time, and modifying entity (i.e., they might have the same values for the "version", "when", and "by" attributes). If the winning item already has an identical item in its conflict collection, that particular item may not be copied. Similarly, if a losing item's resolved conflict collection is not empty, any items in the losing item's resolved conflict collection may be copied to the winning item's resolved conflict collection, unless the winning item already has an identical item in its resolved conflict collection. Then, any identical items that exist in both the winning item's conflict collection and the winning item's resolved conflict collection may be removed from the winning item's conflict collection.

Finally, in the case where the items were found to be in conflict—for example, they may have been found to be in conflict during operation 910—the losing item may be preserved as part of the winning item's data. In at least some implementations, this might be implemented by deleting the losing item's conflict and resolved conflict collections (perhaps by removing the losing item's "conflicts" and "resolvedconflicts" elements), and by then appending the losing item to the winning item's conflict collection, perhaps by appending the losing item's "item" element to the winning item's "conflicts" element. The previously presented example XML showing a "conflicts" element demonstrates one exemplary manner in which this might be done for the described example.

Figure 10:
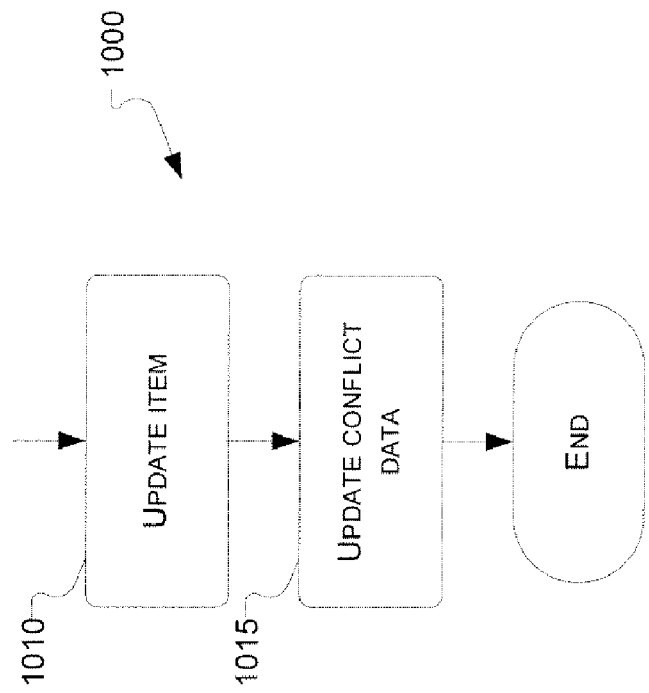
FIG. 10 illustrates an exemplary generalized operational flow that includes operations that might be performed as part of resolving conflicts.

Turning now to FIG. 10, shown therein is an exemplary generalized operational flow 1000 that includes operations that might be performed as part of resolving conflicts. This description of FIG. 10 may be made with reference to other figures. However, it should be understood that the operational flow described with reference to FIG. 10 is not intended to be limited to being used with the elements described with reference to these other figures. In addition, while the exemplary operational flow of FIG. 10 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

Some implementations may provide the ability to "resolve a conflict," where such resolution may refer to the modification of an item after one or more conflicts associated with that item have been identified. In at least some cases, the resolution of conflicts may be performed by a user or some other entity outside of the context of the synchronization operations. For example, a user may examine the data identified by a merge procedure as the "winning" and "losing" data, and validate that the data chosen as the winning data was correct, that the losing data should have been chosen, or that some other data—perhaps in some cases a manual combination of pieces of data, for example—should instead be used.

In an exemplary implementation of operation 1010, an item may be updated with the appropriate data. In this context, the appropriate data may be selected from one of the following: the most recent item data (i.e., this might be the case if winning item identified in a merge procedure had the correct data); the data associated with one of the members of the item's conflict collection; and from some other source, including completely new data, some user-performed manual combination of existing and/or new data, and so on. In some implementations, such an update may need to be performed using the same procedures as other updates. For example, in implementations that use the modification operations previously described with reference to FIG. 6, the item's version may be incremented, the update history may be modified, and so on.

In at least one implementation of operation 1015, conflict data may be updated after the item itself is updated in operation 1010. As part of this operation, a resolved conflict collection may be created for the item, if one does not already exist. In cases where a feed is represented using XML, this may at some point result in the creation of a "resolvedconflicts" element. Then, any members of the item's conflict collection that are deemed to no longer be relevant or valid may be moved from the conflict collection to the resolved conflict collection. In cases where a feed is represented using XML, this may at some point result in moving items that are children of the "conflicts" element to be children of the "resolvedconflicts" element. In this context, whether a member of the conflict collection is no longer relevant or valid may be determined by the user or entity resolving the conflict. In some cases this may result in all of the members of the conflict collection being moved to the resolved conflict collection, while in other cases only some, or none, of the members of the conflict collection may be moved to the resolved conflict collection. For example, if a member of the conflict collection exists that is not addressed by the data used during the update item operation 1010, that member may remain in the conflict collection. After any items have been moved to the resolved conflict collection, if the conflict collection contains no remaining items, the conflict collection itself may be deleted which, in XML feed representations, may result in the removal of the "conflicts" element.

As just one example, using the example XML representation described previously with reference to operational flow 900 and FIG. 9, after one possible conflict resolution procedure, an item might have the following representation:

```
<item>
  <sx:sync id="0a7903db47fb0ae8" version="4" deleted="false">
    <sx:history when="Fri, 7 Jul 2006 20:27:24 GMT" by="endpointB">
      <sx:update when="Thu, 6 Jul 2006 20:27:23
        GMT" by="endpointB">
      <sx:update when="Thu, 6 Jul 2006 20:27:21
        GMT" by="endpointA" />
      <sx:update when="Thu, 6 Jul 2006 20:27:20
        GMT" by="endpointA" />
    </sx:history>
    <sx:resolvedconflicts>
      <item>
        <sx:sync id="0a7903db47fb0ae8" version="3" deleted="false">
          <sx:history when="Thu, 6 Jul 2006 20:27:22
            GMT" by="endpointA">
            <sx:update when="Thu, 6 Jul 2006 20:27:21
              GMT" by="endpointA" />
            <sx:update when="Thu, 6 Jul 2006 20:27:20
              GMT" by="endpointA" />
          </sx:history>
        </sx:sync>
        <title>This is a test title, modified by endpoint A</title>
        <description>This is a test item description.</description>
      </item>
    </sx:resolvedconflicts>
  </sx:sync>
  <title>This is a resolved test title </title>
  <description>This is a test item description.</description>
</item>
```

In this example, the "title" element has been modified to contain new data, the version and update history of the item have been updated as part of the modification, the "item" element that was previously part of the conflict collection has been moved to the resolved conflict collection, and the conflict collection has been removed because it no longer contained any items.

Example Computing Environment

Figure 11:
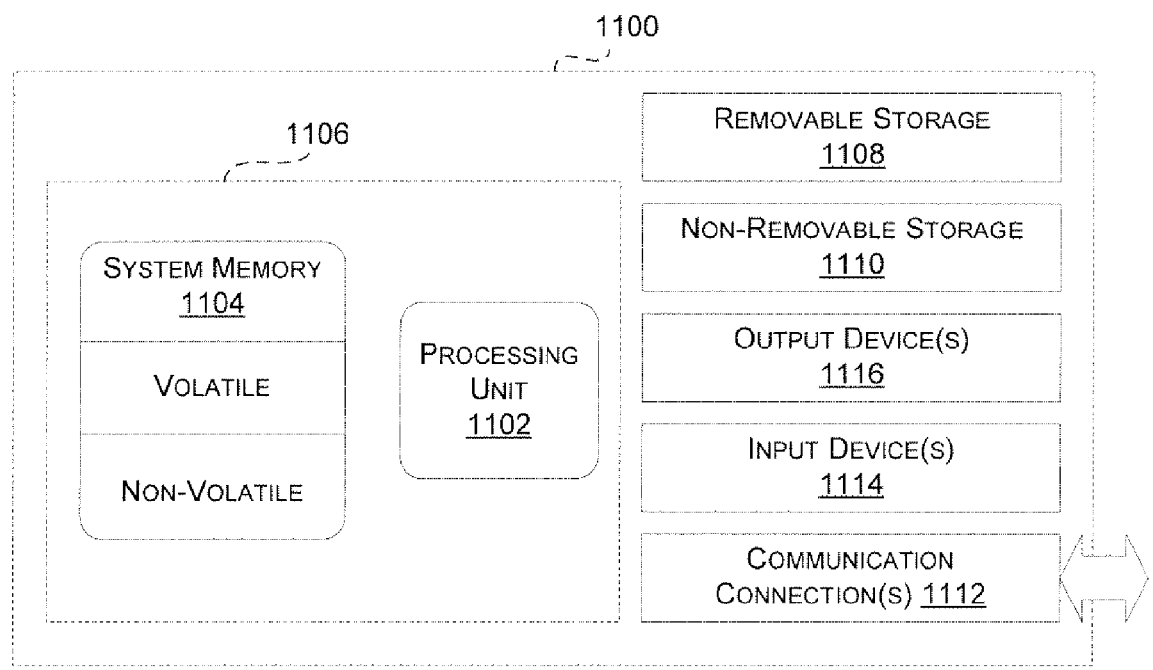
FIG. 11 illustrates an exemplary computer device in which the various technologies described herein may be implemented.

Turning now to FIG. 11, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1100 illustrated in FIG. 11.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 1100 illustrated in FIG. 11, in its most basic configuration, includes at least one processing unit 1102 and memory 1104. In some implementations, the computing device 1100 may implement all or part of, for example, one of the endpoints described previously with reference to FIG. 1, such as endpoint A 110, endpoint B 120, and so on. In some implementations, the processing unit 1102 may be a general purpose central processing unit (CPU), as exists, for example, on a variety of computers, including desktop and laptop computers. Depending on the exact configuration and type of computing device, the memory 1104 may be volatile (such as RAM), non-volatile (such as ROM, flash memory, etc.), or some combination of the two. This most basic configuration is illustrated in FIG. 11 by dashed line 1106. Additionally, the computing device 1100 may also have additional features and functionality. For example, the computing device 1100 may also include additional storage (removable and/or non-removable) including, but not limited to, magnetic or optical disks or tape. Such additional storage is illustrated in FIG. 11 by the removable storage 1108 and the non-removable storage 1110.

The computing device 1100 may also contain one or more communications connection(s) 1112 that allow the computing device 1100 to communicate with other devices and services. For example, the computing device might have one or more connections to other computing devices, including, for example, connections to endpoints as described previously with reference to FIG. 1. Such connections may in some cases comprise the communications means 115, also described previously with reference to FIG. 1. The computing device 1100 may also have one or more input device(s) 1114 such as an image input devices like cameras or scanners, keyboards, mice, pens, voice input devices including microphone arrays, touch input devices, and so on. One or more output device(s) 1116 such as a display, speakers, printer, and so on, may also be included in the computing device 1100.

Those skilled in the art will appreciate that the technologies described herein may be practiced with computing devices other than the computing device 1100 illustrated in FIG. 11. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 11, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
identifying a data set to manage, wherein the data set to manage is associated with a synchronization relationship utilizing a feed comprising a sync data element, and wherein an item data element and the sync data element and the item data element are related to each other;
identifying an item management action associated with the data set to manage;
communicating an item management request that comprises the item management action and an identification of the data set to manage;
obtaining an item management response to the item management request; and
processing the item management response, wherein the processing comprises displaying a user interface representation configured to allow identification of a second item management action and initiation of a second item management request associated with the second item management action.

2. The method of claim 1 wherein the item management action is one of: listing a set of items; retrieving item data for an item; updating item data for a second item; deleting a third item; and creating a new item.

3. The method of claim 1, wherein the item management response includes the user interface representation.

4. The method of claim 3 wherein the user interface representation comprises HTML.

5. The method of claim 3 wherein the user interface representation comprises executable code that, when executed, communicates the second item management request.

6. The method of claim 1, wherein the item management response includes data that is associated with the item management action and the data is not immediately usable to provide the user interface representation.

7. The method of claim 6 wherein the data is represented in one of: a JSON format or a SOAP format.

8. The method of claim 1, further comprising:
communicating a third item management request when the item management response indicates that the item management request would cause a conflict.

9. A method, comprising:
obtaining at least one item management request from a client endpoint, wherein the at least one item management request comprises a requested item management action and an identification of a data set to manage, and wherein the requested item management action is to update item data associated with an item or to delete the item, and wherein the data set to manage is associated with a synchronization relationship utilizing a feed comprising a sync data element and an item data element, and wherein the sync data element and the item data element are related to each other; and performing the requested item management action, wherein the performing comprises:
- modifying item data associated with the item data element or setting a deleted attribute associated with the sync data element to true;
- incrementing a version value associated with the sync data element;
- creating a new update element associated with the sync data element and further associated with at least one of: a previous most recent modification time or a previous most recent modifying entity.

10. The method of claim 9, further comprising:
communicating an item management response to the client endpoint.

11. The method of claim 9, wherein the at least one item management request further comprises another item management action to: list a set of items; retrieve item data for an item; update item data for a second item; delete a third item; or create a new item.

12. The method of claim 9 further comprising:
communicating an item management response to the client endpoint that includes: JSON data, SOAP data, or HTML data.

13. The method of claim 9 wherein the performing further comprises:
updating at least one of: a most recent modification time history attribute associated with the sync data element and a most recent modifying entity history attribute associated with the sync data element.

14. The method of claim 9 wherein the at least one item management request further comprises at least one other requested item management action to create a new item, and wherein the method further comprises performing the at least one other requested item management action, wherein performing the at least one other requested item management action comprises:
- defining a second item data element in the feed that includes item information associated with the new item; and
- defining a second sync data element in the feed that is related to the second item data element and that comprises an initial version value, a unique identifier, and a new update history with at least one of: a modification time attribute or a modifying entity attribute.

15. The method of claim 9 wherein an endpoint that performs the requested item management action also stores information used to generate the feed in a storage module associated with the endpoint.

16. The method of claim 9 wherein an endpoint performs the requested item management action and information used to generate the feed is stored in a storage module associated with a second endpoint, and the endpoint and the second endpoint are not the same endpoint.

17. The method of claim 9 wherein the data set to manage is associated with schema information that defines characteristics of a property in the data set to manage and wherein the performing further comprises:
using the schema information to interpret property information associated with the property.

18. A system, comprising:
an item management module configured to:
- obtain an item management request from a client endpoint, wherein the item management request comprises an item management action and an identification of a data set to manage, and wherein the data set to manage is associated with a synchronization relationship utilizing a feed comprising a sync data element and an item data element that are related to each other, and wherein the item management action is to create a new item; and
- perform the requested item management action by:
  - defining a second item data element in the feed that includes item information associated with the new item; and
  - defining a second sync data element in the feed that is related to the second item data element and that comprises an initial version value, a unique identifier, and a new update history with at least one of: a modification time attribute or a modifying entity attribute; and a storage module configured to:
store information used to generate the feed.

* * * * *